US009215215B2

(12) United States Patent
Zhou et al.

(10) Patent No.: US 9,215,215 B2
(45) Date of Patent: Dec. 15, 2015

(54) METHOD AND DEVICE FOR PASSING THROUGH ISOLATION DEVICE IN SURVEILLANCE NETWORK

(71) Applicant: Zhejiang Uniview Technologies Co., Ltd, Hangzhou (CN)

(72) Inventors: Di Zhou, Hangzhou (CN); Jiansheng Yu, Hangzhou (CN); Lianchao Wang, Hangzhou (CN)

(73) Assignee: Zhejiang Uniview Technologies Co., Ltd, Hangzhou (CN)

( * ) Notice: Subject to any disclaimer, the term of this patent is extended or adjusted under 35 U.S.C. 154(b) by 0 days.

(21) Appl. No.: 14/377,814

(22) PCT Filed: Feb. 5, 2013

(86) PCT No.: PCT/CN2013/071395
§ 371 (c)(1),
(2) Date: Aug. 8, 2014

(87) PCT Pub. No.: WO2013/117154
PCT Pub. Date: Aug. 15, 2013

(65) Prior Publication Data
US 2015/0222597 A1    Aug. 6, 2015

(30) Foreign Application Priority Data

Feb. 10, 2012  (CN) .......................... 2012 1 0030308
Feb. 10, 2012  (CN) .......................... 2012 1 0030678
May 30, 2012  (CN) .......................... 2012 1 0180552

(51) Int. Cl.
*H04L 29/06*    (2006.01)
*H04L 29/08*    (2006.01)
*H04N 7/18*    (2006.01)

(52) U.S. Cl.
CPC ............ *H04L 63/029* (2013.01); *H04L 67/025* (2013.01); *H04N 7/18* (2013.01)

(58) Field of Classification Search
CPC ....... H04L 63/029; H04L 67/025; H04N 7/18
See application file for complete search history.

(56) References Cited

U.S. PATENT DOCUMENTS

2001/0052014 A1*  12/2001  Sheymov et al. ............. 709/225
2005/0008006 A1   1/2005   Siemens

FOREIGN PATENT DOCUMENTS

| CN | 101159657 A | 4/2008 |
| CN | 101170687 A | 4/2008 |
| CN | 101465844 A | 6/2009 |
| CN | 102111311 A | 6/2011 |

OTHER PUBLICATIONS

State Intellectual Property Office of the P.R. of China, International Search Report of PCT/CN2013/071395, May 16, 2013, SIPO, 5 pages.

* cited by examiner

*Primary Examiner* — Brandon Hoffman
*Assistant Examiner* — Thong Truong
(74) *Attorney, Agent, or Firm* — Alleman Hall McCoy Russell & Tuttle LLP

(57) ABSTRACT

The present invention provides a method for a surveillance node to pass through a network isolation device in an IP surveillance system. The method comprises steps of using a first IP address of a surveillance node per se to initiate a tunnel connection request towards a tunnel server, so as to establish a tunnel connection with the tunnel server. After establishing the tunnel connection, the step is obtaining a second IP address distributed by the tunnel server from the tunnel server, and decapsulating a tunnel packet received from the tunnel server to obtain an inner-layer IP packet indicating the content is surveillance signaling. The method further comprises the step of processing the surveillance signaling, encapsulating the surveillance signaling generated by the surveillance node into the inner-layer IP packet, and then encapsulating the inner-layer IP packet into the tunnel packet and sending the same to the tunnel server. The tunnel server forwards the inner-layer IP packet to a surveillance node of an outside network of a network isolation device. The present invention can effectively assist a surveillance node in a surveillance system to pass through a network isolation device, and solve various service problems caused by the isolation device.

18 Claims, 6 Drawing Sheets

METHOD AND DEVICE FOR PASSING THROUGH ISOLATION DEVICE IN SURVEILLANCE NETWORK

CROSS REFERENCE TO RELATED APPLICATIONS

The present application is the U.S. National Phase of PCT/CN2013/071395, filed on Feb. 5, 2013, which claims priority to Chinese Patent Application No. 201210030308.1, filed on Feb. 10, 2012, Chinese Patent Application No. 201210030678.5, filed Feb. 10, 2012, and Chinese Patent Application No. 201210180552.6, filed May 30, 2012, the entire contents of each of which are hereby incorporated by reference for all purposes.

TECHNICAL FIELD

The present invention is related to the video surveillance field, especially the method and the node for passing through the isolation device in the Internet Protocol (IP) surveillance system.

BACKGROUND

The IP surveillance has evolved into a mainstream scheme in surveillance industry, and successfully applied in Peace Project, highways, security network, parks and other large items. The standards and openness of IP also makes the integration of various network islands and the scale expansion of the network easier. In consideration of the constriction of Ipv4 address resource and the overlapping of the address of each Local Area Network (LAN) segment, as well as the needs of a variety of network security, Network Address Translation (NAT), the firewall, the security isolation gateway and other equipment are used in large networks in a large number. This makes the signaling and the data process of the IP surveillance system very complex, and even lead to some service data is unable to carry out in certain networks. The following briefly describes that when the video surveillance network is in existence under the NAT, the firewall, and the security isolation gateway, why the video surveillance traffic becomes so complex and difficult.

In the presence of a NAT device, because the source IP address or the destination IP address will change after the IP packets pass through the NAT device, and in view of the signaling generally also including the source IP address and the destination IP address, the internal and the external addresses are not uniform. This will causes distress to the process of the video surveillance service. In addition, if the devices in the network outside NAT have to initiate the Transmission Control Protocol (TCP) or User Datagram Protocol (UDP) connection toward inner network firstly, it is necessary to assign the internal server address/port mapping at the NAT devices for the devices in the inner network. Obviously it will waste a lot of public addresses, which is not allowed in many cases. When a control server is capable of determining the devices' location, i.e., inside or outside the NAT, the control server can inform the network device outside the network to initiate actively the connection with the device inside the network. But it requires that each connection performs two or more processes. For a service process comprising various conversations, this combination will be very complicated. Moreover, some of the standard service does not allow the interactive parties to reverse their Client/Server (C/S) roles.

In the presence of the firewall, it requires the firewall to open a significant number of UDP/TCP ports to a terminal outside the firewall, such as the video surveillance client, so as to access the server inside the firewall, such as the video management (VM) server. This gives the security implications to the intranet.

In the presence of the security isolation gateway, a large number of IP proxy gateway (i.e. an traffic from the outside will be send to a proxy IP of the gateway, and the gateway will modify the destination IP and then forward to the intranet) usually requests the gateway to assist in correspondingly modifying the internal information of the signaling. That is because there may be the IP address information included therein. Therefore, every time the surveillance system manufacturers develop a new feature, the gateway company may be asked to make the appropriate characteristics with development.

SUMMARY OF THE INVENTION

The present invention provides a method of passing through a network isolation device in an Internet Protocol (IP) surveillance system and the surveillance node corresponding to the method. The surveillance node is located within an inner-layer network of a network isolation device. The surveillance system includes a plurality of surveillance nodes and a tunnel server, and the surveillance node includes the front-end surveillance equipment, the back-end surveillance equipment, and at least one surveillance server. The at least one surveillance server is a video management server (VM), and the surveillance node includes the tunnel processing logic, the signaling processing logic, and the network interface logic. The network interface logic is configured to send and receive a packet in the IP network. The signaling processing logic is configured to process a surveillance signaling. The tunnel processing logic is configured to initiate a tunnel connection request towards the tunnel server by a first IP address of the surveillance node so as to establish a tunnel connection with the tunnel server, and is also configured to obtain a second IP address assigned by the tunnel server from the tunnel server after establishing the tunnel connection.

The tunnel processing logic is further configured to decapsulate a tunnel packet received from the tunnel server by the network interface logic to obtain an inner-layer IP packet indicating the surveillance signaling, and to submit the surveillance signaling to the signaling processing logic, and the inner-layer IP packet is the packet forwarded from the outside surveillance node of the network isolation device. The destination address of the tunnel packet is the first IP address, and the source address of the tunnel packet is an IP address of the tunnel server itself. The destination address of the inner-layer IP packet is the second IP address, and the source IP address is an IP address of the outside surveillance node.

The tunnel processing logic is further configured to encapsulate the surveillance signaling generated by the signaling processing logic of the surveillance node into the inner-layer IP packet, and to encapsulate the inner-layer IP packet into the tunnel packet. The tunnel packet is sent to the tunnel server via the network interface logic, and the tunnel server forwards the inner-layer IP packet to a surveillance node within an outside network of the network isolation device. The source address of the inner-layer IP packet is the second IP address, and the destination IP address of the inner-layer packet is the IP address of the surveillance node in the outside network. The source address of the tunnel packet is an IP address of the surveillance node, and the destination address of the tunnel packet is an IP address of the tunnel server.

In compared to the present technique, the scheme of the present invention solves the problems of too many service ports existed in the present IP surveillance system, and the confusion of the internal information forwarding in the NAT switching or passing through the gateway. Therefore, the application and development within the surveillance system are easier, and the gateway manufactures are no longer to develop specifically for the service of the surveillance system. Also, for the firewall of the customer, it requires the less open ports or the mapping addresses.

DETAILED DESCRIPTION

Figure 1:
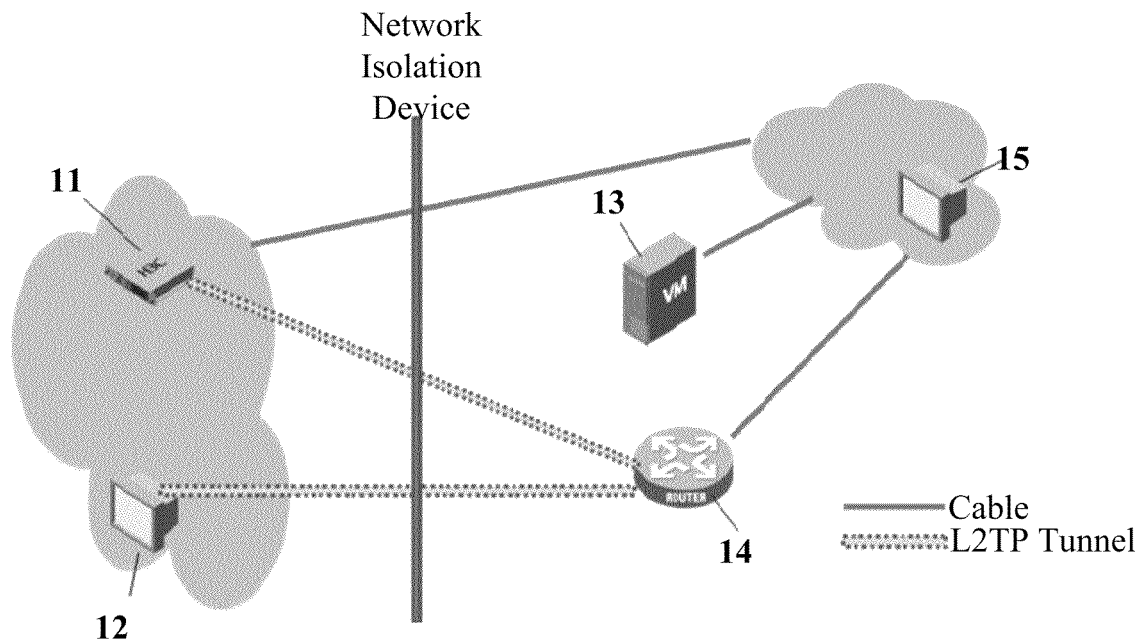
FIG. 1 is a schematic view of an example network environment illustrating the first embodiment.

When an surveillance node passing through a network isolation device, the first surveillance node, as the Local Area Network (LAC) and located within the inner-layer network of the network isolation device, initiates a tunnel connection request towards the tunnel server (such as LAC server, also known as Layer Two Tunneling Protocol (L2TP) relay) by the first IP address of the node itself, so as to establish the L2TP tunnel connection with the tunnel server. The present invention will be described taken the L2TP for example, and the ordinary skill persons in the art can refer to the related Request for Comments (RFC), such as Point-to-Point Tunneling Protocol (PPTP), Generic Routing Encapsulation (GRE), Multi-Protocol Label Switching (MPLS), and Virtual Private Networks (VPN), which is released by Internet Engineering Task Force (IETF), to achieve the present invention.

After the L2TP tunnel connection is established, the first surveillance node obtains the second IP address assigned by the L2TP relay. The first surveillance node receives the tunnel packet from the L2TP relay and decapsulates the tunnel packet to obtain an inner-layer IP packet of which the content is the surveillance signaling. The inner-layer IP packet is the surveillance signaling packet forwarded from the surveillance node located at the outer side of the network isolation device. The destination address of the tunnel packet is the first IP address, and the source address of the tunnel packet is the IP address of the L2TP relay itself. The destination address of the inner-layer IP packet is the second IP address, and the source IP address is the IP address of the outside surveillance node. The first surveillance node obtains the surveillance signaling from the inner-layer IP packet and processes the signaling correspondingly. The first surveillance node encapsulates the generated surveillance signaling into the inner-layer IP packet, and encapsulates the inner-layer IP packet into the tunnel packet and sent the same to the L2TP relay, and the L2TP relay forwards the inner-layer IP packet to the surveillance node located at the outer side of the network isolation device. The source address of the inner-layer IP packet is the second IP address, and the destination IP address of the inner-layer packet is the IP address of the outside surveillance node. The source address of the tunnel packet is an IP address of the surveillance node, and the destination address of the tunnel packet is the IP address of the L2TP relay itself.

The first surveillance node further receives the tunnel packet from the L2TP relay and decapsulates the tunnel packet to obtain the inner-layer IP packet of which the content is the surveillance data. The inner-layer IP packet is the surveillance packet forwarded from the surveillance node located at the outer side of the network isolation device. The destination address of the tunnel packet is the first IP address, and the source address of the tunnel packet is the IP address of the L2TP relay itself. The destination address of the inner-layer IP packet is the second IP address, and the source IP address is an IP address of the outside surveillance node. The first surveillance node further encapsulates the generated surveillance data into the inner-layer IP packet, and encapsulates the inner-layer IP packet into the tunnel packet and then sends the same to the L2TP relay. The L2TP relay forwards the inner-layer IP packet to the surveillance node located at the outer side of the network isolation device. The source address of the inner-layer IP packet is the second IP address, and the destination IP address of the inner-layer packet is the IP address of the outside surveillance node. The source address of the tunnel packet is the IP address of the first surveillance node itself, and the destination address of the tunnel packet is the IP address of the L2TP relay itself. When the first surveillance node is the Video Manager (VM), VM receives the surveillance signaling encapsulated in the tunnel packet, which is forwarded by the L2TP relay via the L2TP tunnel. The surveillance signaling is forwarded from the Encoder (EC) or the Video Client (VC).

When the L2TP relay in the IP surveillance system assists the surveillance node in passing through the network isolation device, the first surveillance node, as the LAC and located within the inner-layer network of the network isolation device, initiates the L2TP tunnel connection request according to the first IP address itself. The L2TP relay, as the L2TP Network Server (LNS), receives the L2TP tunnel connection request. After the tunnel connection with the first surveillance node is established, the L2TP relay assigns the second IP address to the first surveillance node. The L2TP relay receives the tunnel packet from the first surveillance node and decapsulates the tunnel packet to obtain the inner-layer IP packet. The inner-layer IP packet is the surveillance signaling packet or the data forwarded from the first surveillance node to the surveillance node located at the outer side of the network isolation device. The destination address of the tunnel packet is the first IP address of the first surveillance node, and the source address of the tunnel packet is the IP address of the L2TP relay itself. The destination address of the inner-layer IP packet is the IP address of the surveillance node located at the outer side of the network isolation device, and the source IP address is the second IP address. The packet is forwarded to the surveillance node located at the outer side of the network isolation device according to the destination address of the inner-layer IP packet. The IP packet of the surveillance signaling or the surveillance data, which is send from the surveillance node located at the outer side of the network isolation device, is then tunnel encapsulated and forwarded to the first surveillance node. The destination address of the IP packet is the second IP address, and the source IP address is the IP address of the outside surveillance node. The destination address of the encapsulated tunnel packet is the first IP address, and the source address of the tunnel packet is the IP address of the L2TP relay itself.

The second IP address may be the IP address distributed by the L2TP relay in the network located at the outer side of the network isolation device, or be the IP address distributed by the L2TP relay itself. There is the L2TP tunnel connection established between the L2TP relay and the outside surveillance node. The IP packet forwarded from the outside surveillance node is the inner-layer IP packet encapsulate in the tunnel, and the L2TP relay decapsulates the tunnel packet forwarded from the outside surveillance node to obtain the inner-layer IP packet. The source address of the inner-layer IP packet is the IP address assigned by the outside surveillance node via the L2TP relay, and the destination IP address is the second IP address assigned to the first surveillance node. The surveillance nodes in the outside network of the network isolation device include VM and Media Server (MS). In a preferred embodiment, the L2TP relay is the MS located at the outer side of the network isolation device.

The following is the further detailed description according to the drawings in combination with the substantial embodiments. The nodes and the devices describes in the embodiments are defined as follows. The front-end surveillance equipment, such as may be the IP Camera (IPC) or the EC, and EC will be the representative in the following example. The back-end surveillance equipment may be the VC (video client). The VM is the video management server, and the DM is the data management server. The MS is the media exchange server, and the IPSAN is the IP Storage Area Network. The L2TP Network Server (LNS) will be the example of the tunnel server, which is also called the L2TP relay in the present invention, since it also perform the packet forwarding.

The First Embodiment

Please refer to FIG. 1, the IP surveillance system includes a plurality of surveillance node. The surveillance node EC11 is isolated from another network due to the network isolation device. The network isolation device may be the Network Address Translation (NAT), the firewall, or the gateway and so on. In the present embodiment, the network where the surveillance node EC11 of the surveillance system exists belongs to the network inside the isolation device, which is called the network A. The network A is isolated or protected by the network isolation device. The network located at the outer side of the network isolation device is called the network B. Because of the network isolation device, the network A can access the network B anytime, but the network B may not access the network A without the specific configuration due to the isolation device. In the present embodiment, the IP surveillance system further includes the L2TP relay device 14. The IP address of the surveillance node EC11 obtained from the network A (10.10.10.0/24) is 10.10.10.10. The IP address of the L2TP relay 14 is 12.12.10.10 and this address belongs to the public network address from the aspect of the network A, which means the network A may access the L2TP relay directly. If the address may not be accessed directly, the corresponding public network address may be configured by static mapping on the isolation device in the network egress.

The surveillance node EC11, as the LAC, initiates the tunnel connection request towards the L2TP relay 14 functioning as the LNS by the IP address itself (10.10.10.10), so as to establish the L2TP tunnel connection with the L2TP relay 14. After the L2TP relay 14 receives the tunnel connection request, the tunnel connection is established with the surveillance node EC11, and the EC11 is assigned with the address in a pool of address. The addresses in the address pool of the L2TP relay 14 belong to the IP addresses configured in the network B, but are different from the IP addresses of the existed devices in network B. The IP addresses in the address pool of the L2TP relay 14 belong to 12.12.11.0/24, in which the IP address assigned to EC11 is 12.12.11.10. After the EC11 obtains the IP address (12.12.11.10) assigned by the L2TP relay 14, the IP address may be applied in the communication with the surveillance node of network B. For example, EC11 may perform the tunnel encapsulation for the registration packet when it registers in the video management server VM13 of the network B. The IP address of VM13 is 12.12.12.10, which belongs to the network 12.12.12.0/24. The EC11 encapsulates the surveillance signaling, of which the content is the registration packet, into the inner-layer IP packet, and then encapsulates the inner-layer IP packet into the tunnel packet as well as forwards the same to the L2TP relay 14. The source address of the inner-layer IP packet is 12.12.11.10, and the destination address is the IP address of VM13 (12.12.12.10). The source address of the tunnel packet is the IP address of the EC11 itself (10.10.10.10), and the destination address is the IP address of the L2TP relay 14 (12.12.10.10). After the L2TP relay 14 receives the tunnel packet forwarded from the surveillance node EC11, it decapsulates the tunnel packet to obtain the inner-layer IP packet. The L2TP relay 14 routes the inner-layer IP packet according to the route information reserved by the L2TP relay 14 and the destination IP address of the inner-layer IP packet. The route information of the L2TP relay is listed as Table 1:

TABLE 1

| Destination IP address | Mask | Gateway | Egress |
|---|---|---|---|
| 12.12.10.0 | 24 | 12.12.10.1 | Interface 1 |
| 12.12.12.0 | 24 | 12.12.12.1 | Interface 2 |
| ... | ... | ... | ... |
| 12.12.11.10 | 32 | 12.12.11.1 | L2TP_VT1 |

The L2TP relay 14 forwards the packet via the Interface 2 according to the destination IP address 12.12.12.10. The registration packet of the surveillance node EC11 in the network A is finally routed to VM13 in the network B. The VM13 then processes the registration packet after receiving the registration packet, and locally stores the related information of EC11. When it is necessary for the VC to request the video streaming in the EC11, the surveillance signaling for instructing EC11 to transmit surveillance video streaming by VM13 is encapsulated as IP packet and routed to the L2TP relay 14. After that, the L2TP relay 14 performs the tunnel encapsulation to the IP packet transmitted by the VM13 and forwards the same to the EC11. The destination address of the IP packet is the IP address (12.12.11.10) assigned by the EC11, and the source address is the IP address (12.12.12.10) of the VM13. The destination IP address of the encapsulated tunnel packet is the IP address (10.10.10.10) of the EC11 itself, and the source IP address of the tunnel packet is the IP address (12.12.10.10) of the L2TP relay 14. The EC11 receives the tunnel packet from the L2TP relay and decapsulates the tunnel packet to obtain the inner-layer IP packet. The EC11 obtains the surveillance signaling from the inner-layer IP packet and processes the signaling correspondingly. The EC11 forwards the surveillance data to the corresponding surveillance node according to the instruction of the surveillance signaling. The EC11, according to route table itself, forwards the surveillance data via the tunnel or not. When the EC11 forwards the surveillance data via the tunnel, the EC11 encapsulates the corresponding surveillance data into the inner-layer IP packet, and further encapsulates the inner-layer IP packet into the tunnel packet. The tunnel packet is then forwarded to the L2TP relay 14. The source address of the inner-layer IP packet is the IP address (12.12.11.10) which is assigned to the EC11, and the destination address is the IP address of surveillance node that receives the surveillance data, such as the IP addresses of VC or MS, and the surveillance node may be in any network, including but not limited to the networks A or B. For example, the surveillance node may be the VC12 in the network A or the VC15 in network B. The source address of the tunnel packet is the IP address (10.10.10.10) of the EC11 itself, and the destination address is IP address of the L2TP relay 14. L2TP relay 14 receives tunnel packet from the EC11 and decapsulates the tunnel packet to obtain the inner-layer IP packet. The L2TP relay 14 forwards the packet according to the destination IP address of the inner-layer IP packet.

When the VC12 in the network A requests the EC11 for the video streaming, VC12 registers on the VM13. The registration process is the same as what in the EC11. The VC12 establishes the L2TP tunnel with the L2TP relay 14 firstly, and then when the VC12 requests the EC11 for the video streaming, the requested surveillance signaling will be forwarded to VM13 via the L2TP tunnel existed between the VC12 and the L2TP relay 14. The surveillance data is then forwarded from the EC11 to the L2TP relay 14 via the tunnel between the EC11 and the L2TP relay 14, and is further forwarded to VC12 via the tunnel between VC12 and L2TP relay 14.

When the VC15 in the network B requests the EC11 for the video streaming, VC15 registers on the VM13. When the VC15 requests the EC11 for the video streaming, the requested surveillance signaling will be forwarded to VM13 directly, and then the following surveillance data may be forwarded directly to the VC15 without via the tunnel between the EC11 and the L2TP relay 14, or the surveillance data may also be forwarded to the L2TP relay 14 via the tunnel between the EC11 and the L2TP relay 14 firstly, and then be forwarded to VC15 by the L2TP relay 14.

In consideration of the higher cost if the additional router or other network device is adopted as the L2TP relay 14, the MS, in a preferred embodiment, may perform as the L2TP relay 14 if the MS forwarding device exists in the network B of the IP surveillance system. When the VC requests the video streaming, the VM13 instructs the EC11 to forward the video data to the MS which also performs as the L2TP relay 14. The MS then forwards the video data according to the address of the VC.

The Second Embodiment

Figure 2:
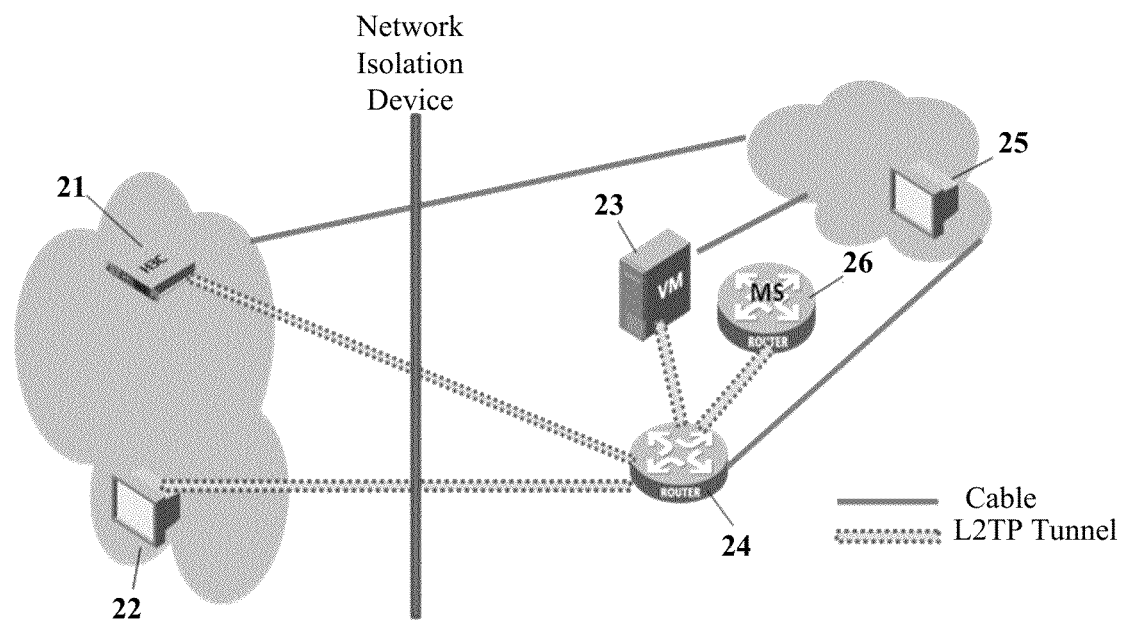
FIG. 2 is a schematic view of an example network environment illustrating the second embodiment.

Please refer to FIG. 2, what is different from FIG. 1 is that the surveillance node VM23 in the network B also performs as the LAC and initiates the tunnel connection request to the L2TP relay 24 which performs as the LNS. The surveillance node VM23 then establishes the L2TP tunnel connection with the L2TP relay 24. In addition, the network B further includes the MS26. The MS26 also performs as the LAC and initiates the tunnel connection request to the L2TP relay 24 which performs as the LNS. The EC21 in the network A, which performs as the LAC, initiates the tunnel connection request to the L2TP relay 24 which performs as the LNS, and then establishes the L2TP tunnel connection with the L2TP relay 24. The IP addresses assigned by the L2TP relay 24 to the surveillance nodes EC21, VM23, and MS26 may be the IP addresses in pool of address. The means the IP addresses in the pool of address may be configured as an independent IP address section, and it is needless to occupy the IP addresses of the network B, such as 14.14.14.0/24 and 15.15.10.0/24 etc. The address 14.14.14.0/24 will be taken for example to describe the communication process of the surveillance node in FIG. 2.

The surveillance node EC21, as the LAC, initiates the tunnel connection request towards the L2TP relay 24 which function as the LNS by the IP address itself (10.10.10.10), so as to establish the L2TP tunnel connection with the L2TP relay 24. After the L2TP relay 24 receives the tunnel connection request, the tunnel connection is established with the surveillance node EC21, and the EC21 is assigned with the address 14.14.14.10 in the pool of address. Similarly, the surveillance node VM23, initiates the tunnel connection request towards the L2TP relay 24 by the IP address itself (12.12.12.10), so as to establish the L2TP tunnel connection with the L2TP relay 24. After the L2TP relay 24 receives the tunnel connection request, the tunnel connection is established with the surveillance node VM23, and the VM23 is assigned with the address 14.14.14.12 in the pool of address. Similarly, the surveillance node MS26, initiates the tunnel connection request towards the L2TP relay 24, and is assigned with the address 14.14.14.14. When EC21 registers on the VM23, it also performs the tunnel encapsulation to the register packet. The EC21 encapsulates the surveillance signaling, of which the content is the registration packet, into the inner-layer IP packet. The EC21 then encapsulates the inner-layer IP packet into the tunnel packet and forwards the same to the L2TP relay 24. After the L2TP relay 24 receives the tunnel packet forwarded from the surveillance node EC21, it decapsulates the tunnel packet to obtain the inner-layer IP packet. The L2TP relay 24 routes the inner-layer IP packet according to the route information reserved by the L2TP relay 24 itself and the destination IP address of the inner-layer IP packet. The route information of the L2TP relay in this embodiment is listed as Table 2:

TABLE 2

| Destination IP adress | mask | gateway | egress |
|---|---|---|---|
| 12.12.10.0 | 24 | 12.12.10.1 | Interface1 |
| 12.12.12.0 | 24 | 12.12.12.1 | Interface2 |
| . . . | . . . | . . . | . . . |
| 14.14.14.10 | 32 | 14.14.14.1 | L2TP_VT1: 1 |
| 14.14.14.12 | 32 | 14.14.14.1 | L2TP_VT1: 2 |
| 14.14.14.14 | 32 | 14.14.14.1 | L2TP_VT1: 3 |

The L2TP relay 14 determines that the registration packet needs the tunnel encapsulation according to the destination IP address 14.14.14.12, and the registration packet is forwarded via the L2TP_VT1:2 interface. The L2TP relay 24 performs the tunnel encapsulation to the inner-layer IP packet, of which the source address is 14.14.14.10 and the destination address is 14.14.14.12. The source IP address of the tunnel packet is the IP address 12.12.10.10 of the L2TP relay 24 itself, and the destination IP address of the tunnel packet is the IP address 12.12.12.10 of the VM23 itself. The encapsulated tunnel packet is forwarded to VM23 via the tunnel between the L2TP relay 24 and the VM23. The VM23 decapsulates the packet to obtain the inner-layer IP packet, and stores the registration information of the EC locally.

When the VC requesting the EC21 for the video streaming in the EC21, the VM23 instructs the EC21 to forward the surveillance signaling of the surveillance video streaming and encapsulates the same as the IP packet. The IP packet is further encapsulated as the tunnel packet, which is forwarded to the L2TP relay 24 via the tunnel between the VM23 and the L2TP relay 24. The source IP address of the inner-layer IP packet of the surveillance signaling is 14.14.14.12, and the destination IP address is 14.14.14.10. The source IP address of the tunnel packet is the IP address 12.12.12.10 of VM23 itself, and the destination IP address of the tunnel packet is 12.12.10.10. After receiving the tunnel packet, the L2TP relay 24 decapsulates the tunnel packet to obtain the inner-layer IP packet, and further performs the tunnel encapsulation to the inner-layer packet according to the inner-layer destination IP address 14.14.14.10. After that, the inner-layer packet is forwarded to the EC21 via the tunnel between the L2TP relay 24 and the EC21. The source IP address of the tunnel is the IP address 12.12.10.10 of the L2TP relay 24 itself, and the destination IP address is the IP address 10.10.10.10 of the EC21 itself. The EC21 receives the tunnel packet and decapsulates the tunnel packet to obtain the inner-layer IP packet. The EC21 obtains the surveillance signaling from the inner-layer IP packet and processes the signaling correspondingly. The surveillance signaling instructs the EC21 to forward the surveillance data to the MS26.

Similarly, the VM23 instructs the MS26 to receive the surveillance data forwarded from the EC21, and further forward the surveillance data to the VC. The EC21 forwards the surveillance data to the L2TP relay 24 via the tunnel between itself and the L2TP relay 24. The surveillance data is performed with the tunnel encapsulate. The source address of the inner-layer IP packet is the IP address 14.14.14.10 assigned to the EC21, and the destination address is the address 14.14.14.14 of MS26 which receives the surveillance data. The source address of the encapsulated tunnel packet is the IP address 10.10.10.10 of the EC21 itself, and the destination address is the IP address of the L2TP relay 24. The L2TP relay 24 receives the tunnel packet from the EC21 and decapsulates the tunnel packet to obtain the inner-layer IP packet. The L2TP relay 24 further performs the tunnel encapsulation to the inner-layer packet according to the inner-layer destination IP address, and forwards the packet to the MS26 via the tunnel between the L2TP relay 24 and the MS26. The encapsulation way is just the same as the above description. After receiving the tunnel packet, the MS26 decapsulates the tunnel packet to obtain the surveillance data packet. The MS26 forwards the surveillance data to the corresponding VC, such as the VC25, according to the instruction of the VM23 and the router table itself.

Figure 2A:
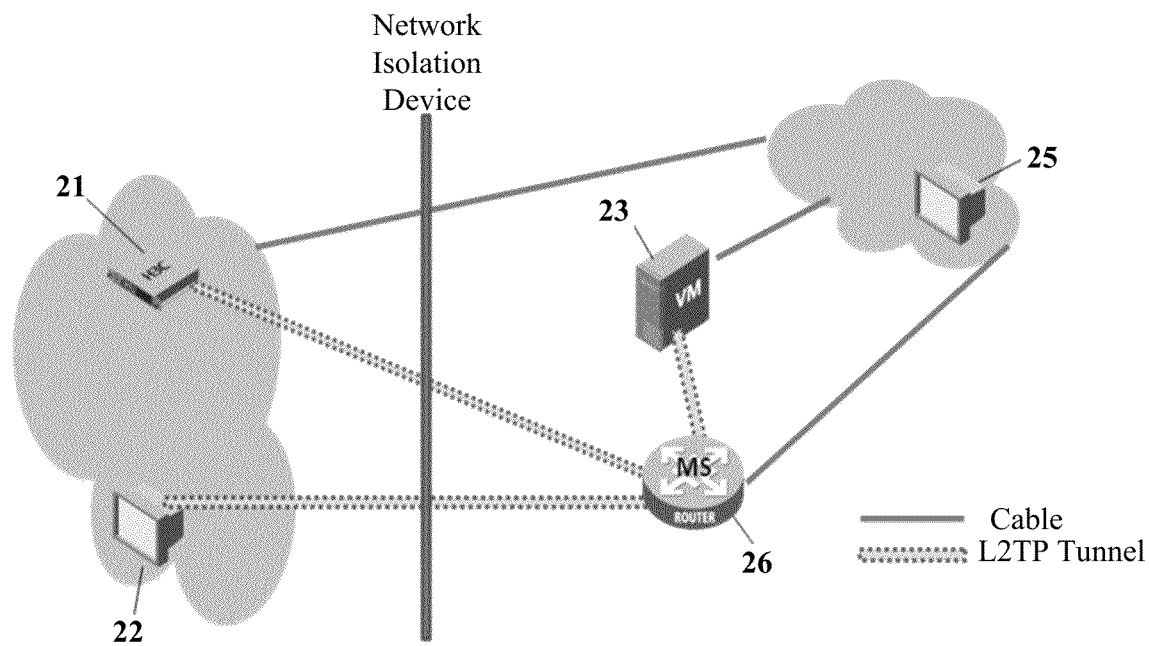
FIG. 2a is a schematic view of another example network environment illustrating the second embodiment

As FIG. 2a shows, when the video streaming is requested by the VC, the VM23 instructs the EC21 forwards the video data to the MS2. The MS26 then forwards the video data according to the address of the VC. For example, when the VC22 in the network A requests the video streaming on the EC21, the VC22 registers on the VM23 firstly. The registration proceeding is the same as the registration proceeding of EC21. The VC22 establishes the L2TP tunnel with the MS26 which performs as the L2TP relay. When the VC22 then requests the video streaming on the EC21, the surveillance signaling of the request is forwarded to the VM23 via the L2TP tunnel between the VC22 and the MS26 as well as the L2TP tunnel between the MS26 and the VM23 firstly. The encapsulating way of the tunnel packet is the same as the encapsulating way of the registration packet which is forwarded form the EC21 to the VM23 to perform the registration. After the MS26 receives the surveillance data forwarded by the EC21 via the tunnel between the EC21 and the MS26, the surveillance data is further forwarded to the VC22 via the tunnel between the VC22 and the MS26.

The Third Embodiment

Figure 3:
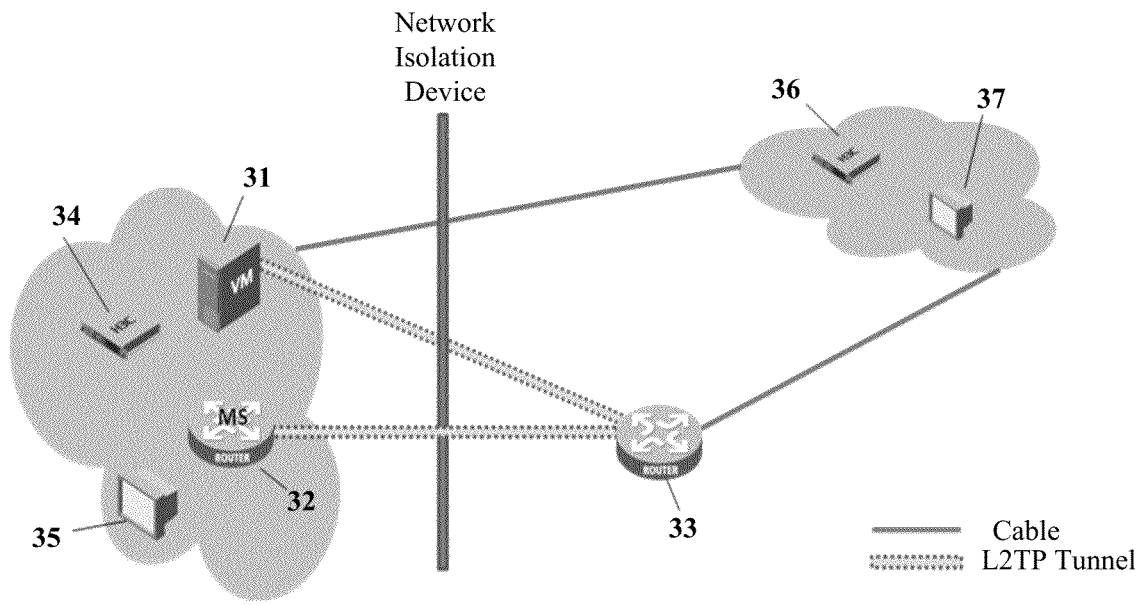
FIG. 3 is a schematic view of an example network environment illustrating the third embodiment.

Please refer to FIG. 3, the IP surveillance system includes the surveillance node VM31. The surveillance node VM31 is isolated from another network due to the network isolation device. The network where the VM31 exists belongs to the network inside the isolation device, which is called the network A. In contrast, the network located at the outer side of the network isolation device is called the network B. Because the existence of the network isolation device, the network B may not access the network A without the specific configuration. The IP surveillance system further includes the L2TP relay device 33. The IP address of the surveillance node VM31 itself is 10.10.10.10, and the IP address of the L2TP relay 33 is 12.12.10.10. The surveillance node VM31 needs to communicate with another surveillance node in the network B, such as EC36 and VC37.

The surveillance node VM31 initiates the tunnel connection request towards the L2TP relay 33 so as to establish the L2TP tunnel connection. After the L2TP relay 33 receives the tunnel connection request, the tunnel connection is established with the surveillance node VM31, and the VM31 is assigned with one address in the address pool. The address pool of the L2TP relay 33 includes addresses relating to the IP addresses configured for the network B. The IP address assigned by the L2TP relay 33 to the VM31 is 12.12.11.10. After VM31 receives the IP address assigned by the L2TP relay 33, the EC36 and VC37 in the network B will be informed with the IP address so as that they may register to VM31.

The registration process to VM31 is described taking the EC36 for example. The EC36 firstly forwards the registration packet, and the destination IP address of the packet is the IP address 12.12.11.10 assigned to the VM31. The packet is routed to the L2TP relay 33, and the L2TP relay 33 performs the tunnel encapsulation to the registration packet, which means the registration packet is encapsulated to the inner-layer IP packet. The inner-layer IP packet is then encapsulated into the tunnel packet and forwarded to the VM31. The destination address of the inner-layer IP packet is the IP address 12.12.12.10 of the VM31, and the source address is the IP address of the EC36 itself, such as 12.12.12.16. The source address of the tunnel packet is the IP address 12.12.10.10 of the L2TP relay 33 itself, and the destination address of the tunnel is the IP address 10.10.10.10 of the VM31. After the VM31 receives the tunnel packet, the VM31 decapsulates the tunnel packet to obtain the inner-layer IP packet. The VM31 stores the decapsulated information related to the EC36 locally. The registration process of the VC37 to VM31 is the same as the registration process of EC36. When the EC34 and the VC35 in the network A register toward the VM31 in the network A, the registration packet of which the destination address is 10.10.10.10 is forwarded directly to VM31 for registration.

The surveillance node MS32 in network A, like the VM31, establishes the L2TP tunnel connection with the L2TP relay 33 and obtains the IP address assigned by the L2TP relay 33. The EC34 and VC35 in the network A is unnecessary to independently establish the L2TP tunnel with the L2TP relay 33. If there is no MS32 in the network A, the EC34 and VC35 may establish the L2 tunnel with the L2TP relay 32.

When the VC37 in the network B requests the EC34 in the network A for the video streaming, the surveillance signaling of the request from the VC37 is forwarded to the VM31 like the registration packet of EC36. The surveillance signaling packet is directly forwarded from the VM31 to the EC34 in the network A. The surveillance signaling is to instruct the EC34 to send the surveillance video streaming and is forwarded using the IP address 10.10.10.8 of the EC34 as the destination IP address. The surveillance signaling instructs the EC to forward the surveillance data to the MS32. The EC34 forwards the surveillance data to the MS32 according to the instruction of the surveillance signaling. The VM31 instructs the MS32 to forward the surveillance data to the VC37. The MS32, according to route table itself, forwards the surveillance data via the tunnel or not. The way the MS32 forwards the surveillance data (before that, the MS32 has already established the L2TP tunnel with the L2TP relay 33) via tunnel is the same as that in the first embodiment. If there is no MS32 in the network A, the EC34, according to route table itself, forwards the surveillance data via the tunnel or not.

When the VC35 requests the EC36 for the video surveillance streaming, the VC35 in the inner network forwards the video on-demand packet from the source IP to the destination IP address 10.10.10.10 of the VM31, and the source IP is the IP address 10.10.10.6 of the VC35 itself. After the VM31 receives the on-demand packet, it forwards the surveillance signaling packet instructing the EC36 to forward the surveillance video streaming. The surveillance signaling may be forwarded via the tunnel or not, which is majorly dependent on the route table of VM. The surveillance signaling packet instructs the EC36 to forward the surveillance data to the MS32. After the EC36 receives the surveillance signaling packet, the corresponding surveillance video data is routed to the L2TP relay 33 firstly. The L2TP relay 33 then performs the tunnel encapsulation to the surveillance data according to the destination IP address. The encapsulated tunnel packet is forwarded to the MS32 via the tunnel between the L2TP relay 33 and the MS32. The MS32 decapsulates the tunnel packet to obtain the inner-layer packet. The MS32 forwards the packet to the VC35 according to the instruction of VM31. The cost will be higher if the L2TP relay 33 is performed singly by a router or the other network device, and hence the MS may be adopted as the L2TP relay 33.

The Fourth Embodiment

Figure 4:
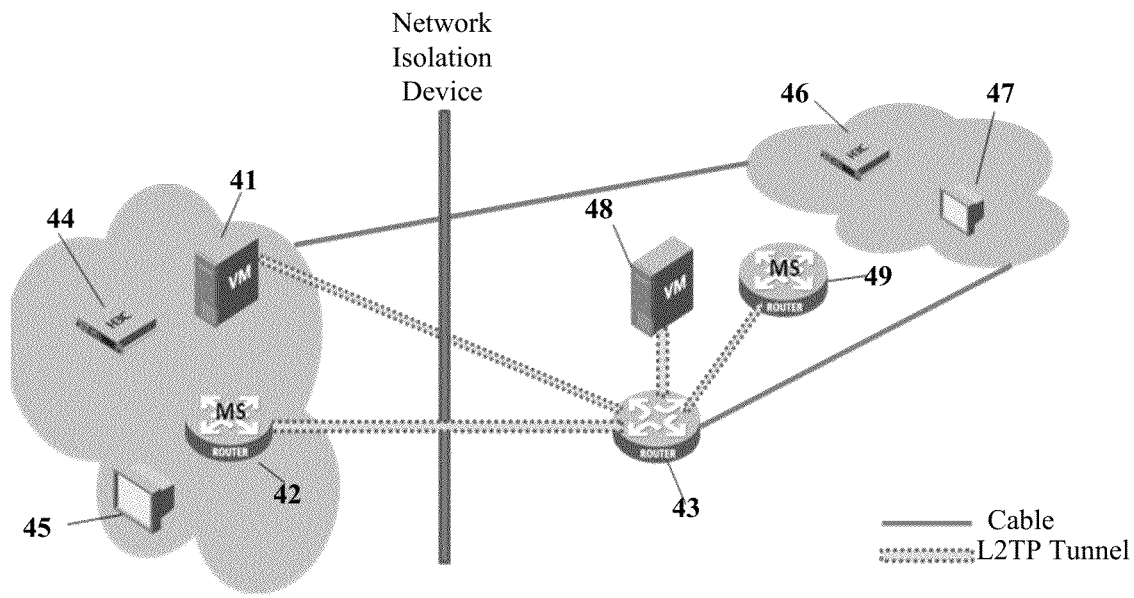
FIG. 4 is a schematic view of an example network environment illustrating the fourth embodiment.

Please refer to FIG. 4, what is different from FIG. 3 is that the surveillance node VM48 in the network B initiates the tunnel connection request to the L2TP relay 43 and establishes the L2TP tunnel connection with the L2TP relay 43. In addition, the network B further includes the MS49. The MS49 also initiates the tunnel connection request to the L2TP relay 43 and establishes the L2TP tunnel connection with the L2TP relay 43. The VM41 in the network A also initiates the tunnel connection request to the L2TP relay 43 and then establishes the L2TP tunnel connection with the L2TP relay 43. In this situation, the IP addresses assigned by the L2TP relay 43 to the surveillance nodes VM41, VM48, and MS49 may be the IP addresses in the independent pool of address. The means the IP addresses in the pool of address may be configured as an independent IP address section, and it is needless to occupy the IP addresses configured by the network B, such as 14.14.14.0/24 and 15.15.10.0/24 etc.

FIG. 4 is the second-level domain, including two management domains. Among which, the surveillance domain X consists of the VM41, the MS42, the EC44 and the VC45, and another surveillance domain Y consists of the VM48, the MS49, the EC46 and the VC47. The surveillance management domain X is the down-level domain, and Y is the top-level domain. The domain Y manages the domain X. The nodes EC44, VC45 and MS42 register on the VM41. The registration packet is needless to pass the tunnel, and may be forwarded directly to the IP address of the VM41, i.e., 10.10.10.10, as the destination IP address. The VM41 stores the registration information. The nodes EC46, VC47 and MS49 register on the VM48. The registration packet is needless to pass the tunnel, and may be forwarded directly to the IP address of the VM48, i.e., 12.12.12.10, as the destination IP address. The VM48 stores the registration information. The nodes VM41 registers on the VM48. The VM41 initiates the tunnel connection request to the L2TP relay 43 so as to establish the L2TP tunnel connection with the L2TP relay 43 based on the IP address 10.10.10.10 itself. After the L2TP relay 43 receives the tunnel connection request, the tunnel connection is established with the surveillance node VM41, and the VM41 is assigned with the address 14.14.14.10/24 in the pool of address. The VM48 initiates the tunnel connection request to the L2TP relay 43 so as to establish the L2TP tunnel connection with the L2TP relay 43 based on the IP address 12.12.12.10 itself. After the L2TP relay 43 receives the tunnel connection request, the tunnel connection is established with the surveillance node VM48, and the VM48 is assigned with the address 14.14.14.12/24 in the pool of address. Similarly, the surveillance node MS42 initiates the tunnel connection request towards the L2TP relay 43, and is assigned with the address 14.14.14.14. The surveillance node MS39 initiates the tunnel connection request towards the L2TP relay 43, and is assigned with the address 14.14.14.15.

When the VC in the network A requesting the video streaming in the network B, such as the VC45 requesting the EC46 for the surveillance video data, the VC45 in the network A forwards the request to the VM41 directly, and the VM41 encapsulates the request into the inner-layer IP packet. The inner-layer IP packet is further encapsulated as the tunnel packet, and is forwarded to the L2TP relay 24. The source IP address of the inner-layer IP packet is 14.14.14.10, and destination IP address is the IP address 14.14.14.12 assigned to the VM48. The source IP address of the tunnel packet is the IP address 10.10.10.10 of VM41 itself, and the destination IP address of the tunnel packet is the IP address 12.12.10.10 of the L2TP relay 43. After receiving the tunnel packet, the L2TP relay 43 decapsulates the tunnel packet to obtain the inner-layer IP packet. The L2TP relay 44 routes the inner-layer IP packet according to the route information reserved by the L2TP relay 44 itself and the destination IP address of the inner-layer IP packet. The route information of the L2TP relay 43 in this embodiment is listed as Table 3:

TABLE 3

| Destination IP address | Mask | Gateway | Egress |
|---|---|---|---|
| 12.12.10.0 | 24 | 12.12.10.1 | Interface1 |
| 12.12.12.0 | 24 | 12.12.12.1 | Interface2 |
| ... | ... | ... | ... |
| 14.14.14.10 | 32 | 14.14.14.1 | L2TP_VT1: 1 |
| 14.14.14.12 | 32 | 14.14.14.1 | L2TP_VT1: 2 |
| 14.14.14.14 | 32 | 14.14.14.1 | L2TP_VT1: 3 |
| 14.14.14.15 | 32 | 14.14.14.1 | L2TP_VT1: 4 |

The L2TP relay 24 determines that the registration packet needs the tunnel encapsulation according to the destination IP address 14.14.14.12, and the registration packet is forwarded via the L2TP_VT1:2 interface. The L2TP relay 43 performs the tunnel encapsulation to the inner-layer IP packet, of which the source address is 14.14.14.10 and the destination address is 14.14.14.12. The source IP address of the tunnel packet is the IP address 12.12.10.10 of the L2TP relay 43 itself, and the destination IP address of the tunnel packet is the IP address 12.12.12.10 of the VM23 itself. The encapsulated tunnel packet is forwarded to VM48 via the tunnel between the L2TP relay 43 and the VM48. The VM48 decapsulates the packet to obtain the inner-layer IP packet. The VM48 informs the EC46 to forward the surveillance video data to the MS49, and the MS49 further performs the tunnel encapsulation to the packet and the packet to the L2TP relay 43 via the tunnel between the MS49 and the L2TP relay 43. The L2TP relay 43 decapsulates the tunnel packet, and determines if forwarding via the tunnel is required. After performing the tunnel encapsulation to the surveillance data, it is forwarded to the MS42 via the tunnel between the L2TP relay 43 and the MS42, and is further forwarded to the VC45 from the MS42. The process of forwarding the surveillance data via the two tunnel encapsulations is similar to the processes of forwarding the surveillance signaling or the surveillance data via the two tunnel encapsulations.

Figure 4A:
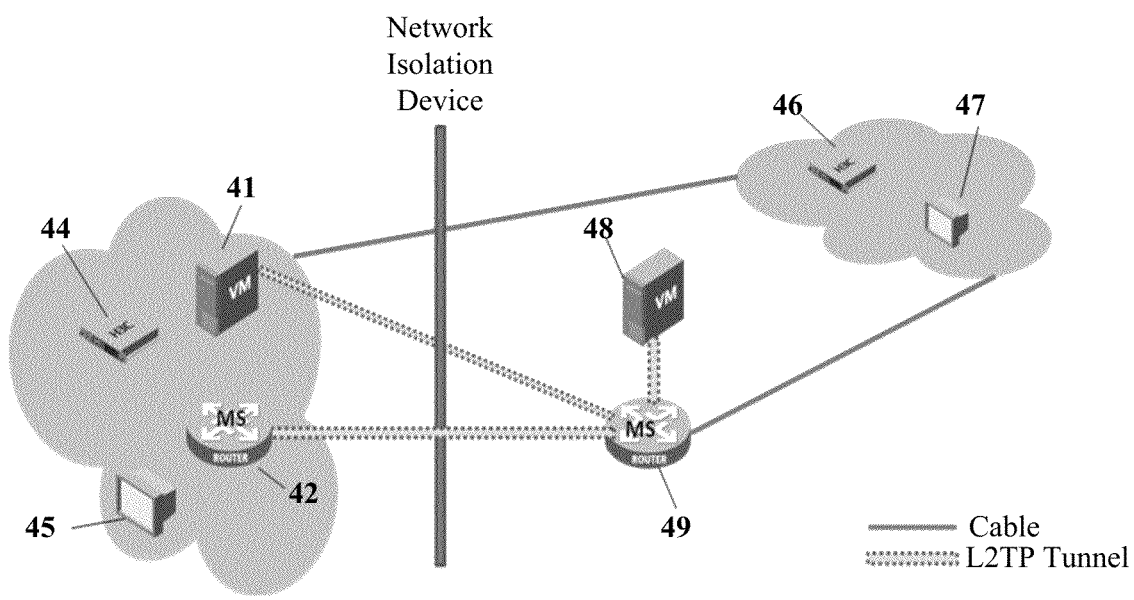
FIG. 4a is a schematic view of another example network environment illustrating the fourth embodiment.

The process of the VC47 requesting the EC44 is similar to the processes of the VC45 requesting the EC46 as mentioned. The cost will be higher if the L2TP relay 43 is performed singly by a router or the other network device, and hence the MS49 adopted as the L2TP relay 33 in the fourth embodiment is better way, which is showed as FIG. 4*a*. The process of proceeding the video surveillance service is mentioned above.

All four embodiments mentioned above are describing how the surveillance nodes inside/outside the network isolation device communicate with each other in the IP surveillance system, which is based on the example of live video requesting. The IP surveillance system, may further includes DM and the storing device, and these surveillance nodes inside/outside the network isolation device may communicate with each referring to the process of live video requesting indicated previously.

Figure 5:
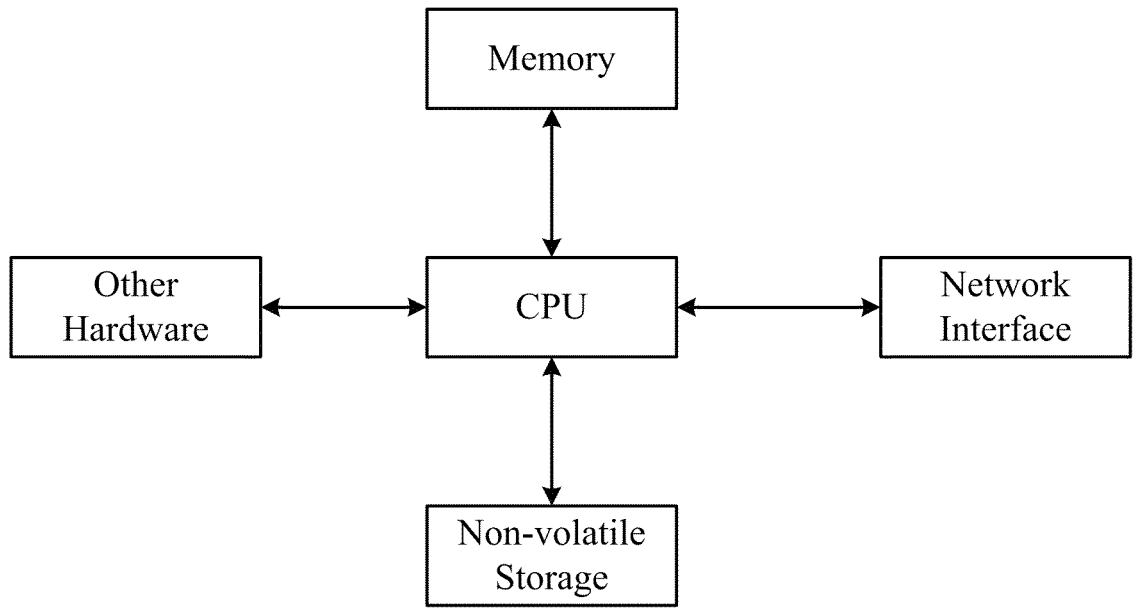
FIG. 5 is a general configuration diagram of the surveillance node or the L2TP relay device in the present invention.
Figure 6:
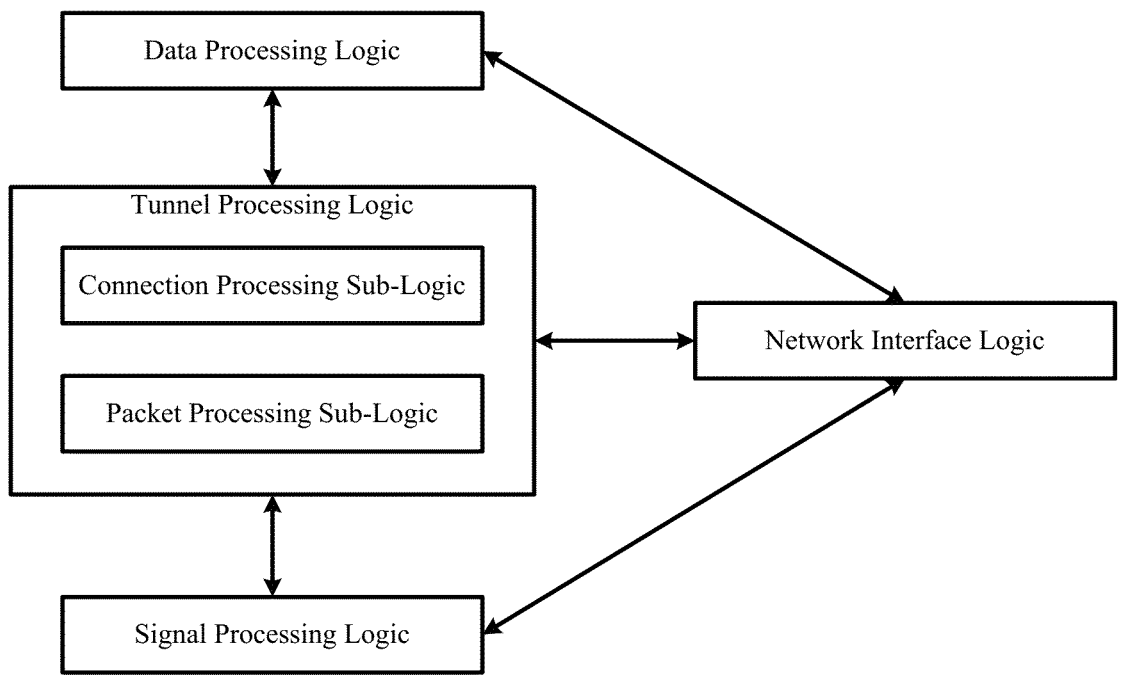
FIG. 6 is a logic block diagram of the surveillance node or the L2TP relay device in the present invention.

Please refer to FIGS. 5 and 6. FIG. 5 shows a basic hardware configuration generally suitable for the different nodes or devices. The various devices are different in the hardware. For example, L2TP relay may not require the hardware unless it is the MS to be used as the L2TP relay. Similarly, VM may not have the hardware. FIG. 6 is a logic block diagram showing the surveillance node or the L2TP relay device, which is usually performed by the computer program. Similarly, the logic configuration of each device may be a little different. For example, if the L2TP relay device does not involve in the service processing, the data and the signaling processing logics may be unnecessary. The VM belongs to the management server, which usually does not include the data processing logic.

The general logic configuration showed in FIG. 6 includes the tunnel processing logic, the signaling processing logic, the data processing logic, and the network interface logic. The tunnel processing logic further includes the connection processing sub-logic and the packet processing sub-logic. The signaling processing logic and the data processing logic process the signaling and the data respectively. The network interface logic is responsible for receiving/forwarding the packet. The connection processing sub-logic is majorly responsible for establishing the L2TP tunnel connection and maintaining the tunnel connection, and the packet processing sub-logic is majorly responsible for encapsulating/decapsulating the packet.

Please refer to FIG. 6 for the surveillance node passing through the network isolation device in the IP surveillance system of the present invention. The surveillance node includes the tunnel processing logic, the signaling processing logic, and the network interface logic. The tunnel processing logic includes the connection processing sub-logic and the packet processing sub-logic. The network interface logic is configured to receive/forward the packet in the IP network, and the signaling processing logic is configured to process the surveillance signaling. The connection processing sub-logic is configured to initiates the tunnel connection request towards the L2TP relay functioning as the LNS by the first IP address itself, so as to establish the L2TP tunnel connection with the L2TP relay. After establishing the L2TP tunnel connection, the connection processing sub-logic obtains a second IP address assigned by the L2TP relay. The packet processing sub-logic is configured to decapsulate the tunnel packet received from the L2TP relay by the network interface logic to obtain the inner-layer IP packet indicating the surveillance signaling, and to submit the surveillance signaling to the signaling processing logic. The inner-layer IP packet is the packet forwarded from the outside surveillance node of the network isolation device. The destination address of the tunnel packet is the first IP address, and the source address of the tunnel packet is the IP address of the L2TP relay itself. The destination address of the inner-layer IP packet is the second IP address, and the source IP address is the IP address of the outside surveillance node. The packet processing sub-logic is further configured to encapsulate the surveillance signaling generated by the signaling processing logic of the surveillance node into the inner-layer IP packet, and to encapsulate the inner-layer IP packet into the tunnel packet and to send the tunnel packet to the network interface logic. The tunnel packet is further send to the L2TP relay via the network interface logic, and the L2TP relay forwards the inner-layer IP packet to the surveillance node in the outside network of the network isolation device. The source address of the inner-layer IP packet is the second IP address, and the destination IP address of the inner-layer packet is the IP address of the surveillance node in the outside network. The source address of the tunnel packet is the IP address of the first surveillance node, and the destination address of the tunnel packet is the IP address of the L2TP relay itself.

The surveillance node further includes the data processing logic, which is configured to process the surveillance data. The packet processing sub-logic is further configured to decapsulate the tunnel packet received from the L2TP relay by the network interface logic to obtain the inner-layer IP packet indicating the surveillance data, and to submit the surveillance data to the data processing logic. The inner-layer IP packet is the packet forwarded from the outside surveillance node of the network isolation device. The destination address of the tunnel packet is the first IP address, and the source address of the tunnel packet is the IP address of the L2TP relay itself. The destination address of the inner-layer IP packet is the second IP address, and the source IP address is the IP address of the outside surveillance node. The packet processing sub-logic is further configured to encapsulate the surveillance data generated by the data processing logic of the surveillance node into the inner-layer IP packet, and further to encapsulate the inner-layer IP packet into the tunnel packet. The tunnel packet is then sent to the network interface logic, and is further send to the L2TP relay via the network interface logic. The L2TP relay forwards the inner-layer IP packet to the surveillance node in the outside network of the network isolation device. The source address of the inner-layer IP packet is the second IP address, and the destination IP address of the inner-layer packet is the IP address of the surveillance node in the outside network. The source address of the tunnel packet is the IP address of the first surveillance node itself, and the destination address of the tunnel packet is the IP address of the L2TP relay itself.

The present invention further provides L2TP relay device assisting the surveillance node to pass through the network isolation device in the IP surveillance system. The relay device includes the network interface logic which is configured to receive/forward the packet via the IP network. The relay device further includes the connection processing sub-logic which is configured to receive the L2TP tunnel connection request form the first surveillance node. The first surveillance node, as the LAC and located within the inner-layer network of the network isolation device, initiates the L2TP tunnel connection request according to the first IP address itself. After the tunnel connection with the first surveillance node is established, the first surveillance node is assigned with the second IP address. The relay device further includes the packet processing sub-logic, which is to receive the tunnel packet from the first surveillance node and decapsulates the tunnel packet to obtain the inner-layer IP packet. The inner-layer IP packet is forwarded to the surveillance node located at the outer side of the network isolation device according to the destination address of the inner-layer IP packet. The inner-layer IP packet is the surveillance signaling packet or the data forwarded from the first surveillance node to the surveillance node located at the outer side of the network isolation device. The source address of the tunnel packet is the first IP address of the first surveillance node, and the destination address of the tunnel packet is the IP address of the L2TP relay itself. The destination address of the inner-layer IP packet is the IP address of the surveillance node located at the outer side of the network isolation device, and the source IP address is the second IP address. The packet processing sub-logic is further configured to perform the tunnel encapsulation to the IP packet indicating the surveillance signaling or the surveillance data and to forward the IP packet to the first surveillance node. The IP packet is send from the surveillance node located at the outer side of the network isolation device. The destination address of the IP packet is the second IP address, and the source IP address is the IP address of the surveillance node located at the outer side of the network isolation device. The destination address of the encapsulated tunnel packet is the first IP address, and the source address of the tunnel packet is the IP address of the L2TP relay itself.

Figure 7:
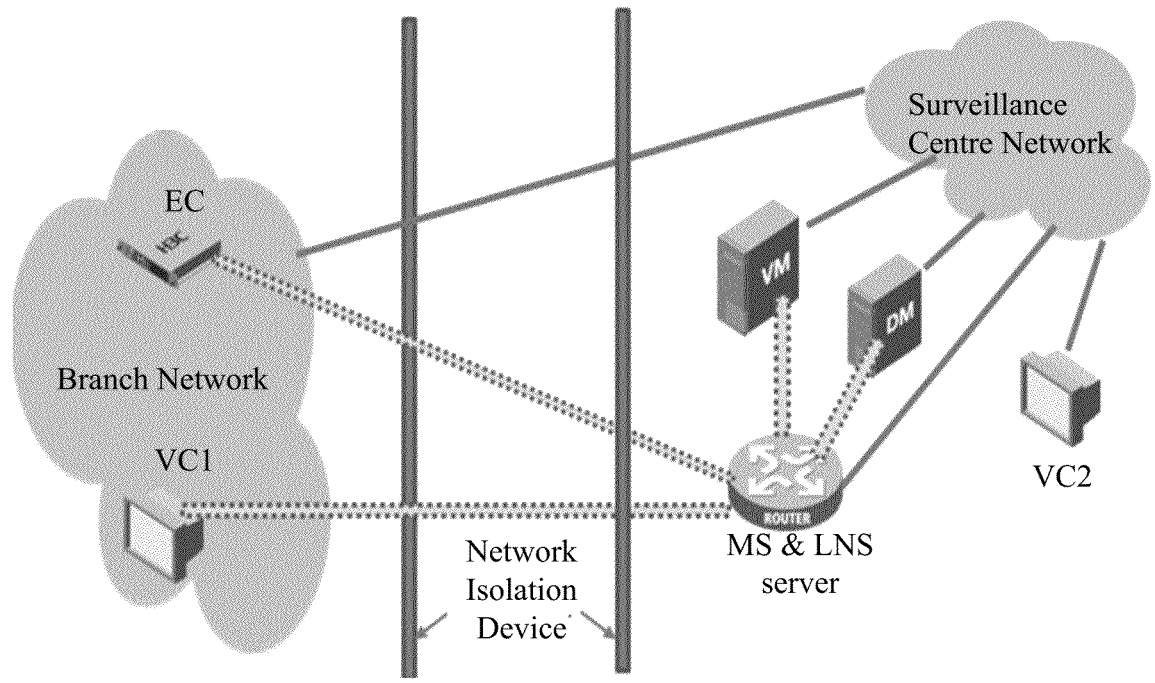
FIG. 7 is an organization diagram of an IP surveillance system showing the isolation device being passed through via the L2TP tunnel.

The communication mode (named as the tunnel mode below) passing through isolation device via the tunnel is provided as above. There are still several features which may be optimized under the tunnel mode. Please refer to FIG. 7, the surveillance system includes the isolation device, EC, VC, VM, DM, MS, and the L2TP relay. In FIG. 7, the EC and VC in the branch network are located inside the isolation device of the network, which is in the side being protected or called the inner network side. In contrast, the surveillance server is outside the isolation device, which is also called the outside network side.

Figure 8:
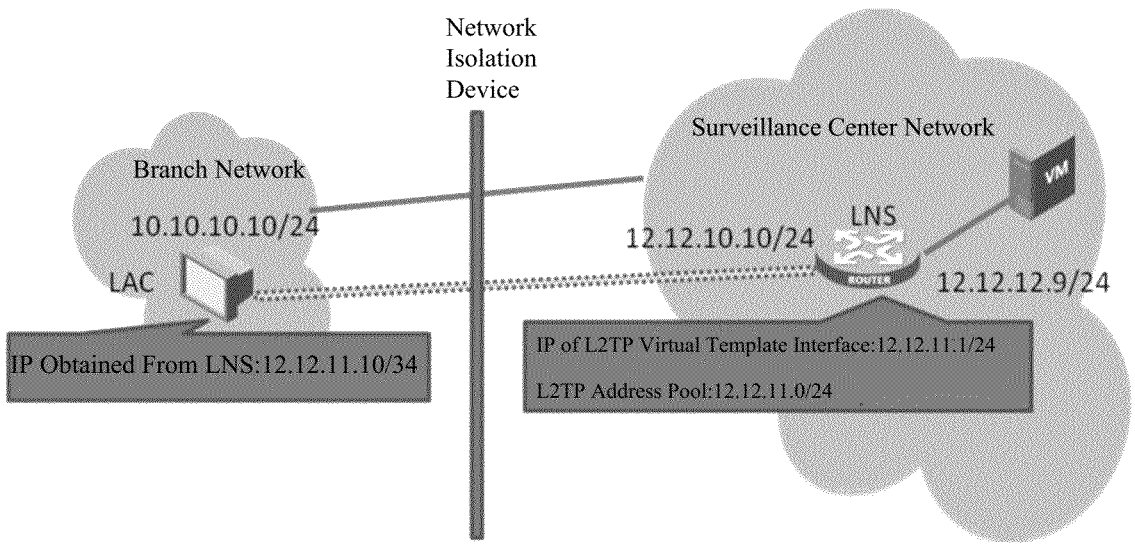
FIG. 8 is another organization diagram of an IP surveillance system showing the isolation device being passed through via the L2TP tunnel.

Please refer to FIGS. 6 and 8, the tunnel inner-layer IP address assigned to the surveillance node (such as VC functioning as the LAC client) in the inner network is the IP address of the outside network. The IP address of VC in the inner network is 10.10.10.10. The VC, as the LAC, initiates the dial-up connection toward the L2TP serving client in the outside network, so as to active the L2TP tunnel to obtain the tunnel inner-layer IP address. The LNS in the outside network has an interface connecting to inner network. The IP address of the interface is 12.12.10.10. This address is the public network address in the view of the inner network, which means may be accessed from the inner network directly. If the address may not be accessed directly, the corresponding public network address may be configured by static mapping on the isolation device that is the egress of the network. In the tunnel mode, the address is the outer layer IP address of the tunnel. The IP address of the interface by which the LNS connects to the devices in the outside network is 12.12.12.9. What must be clarified is that, the public network address and the private address is comparative, which is determined by the network configuration. For example, the public network IP address in the internet may be configured as the private network address and be used repeatedly.

Figure 9:
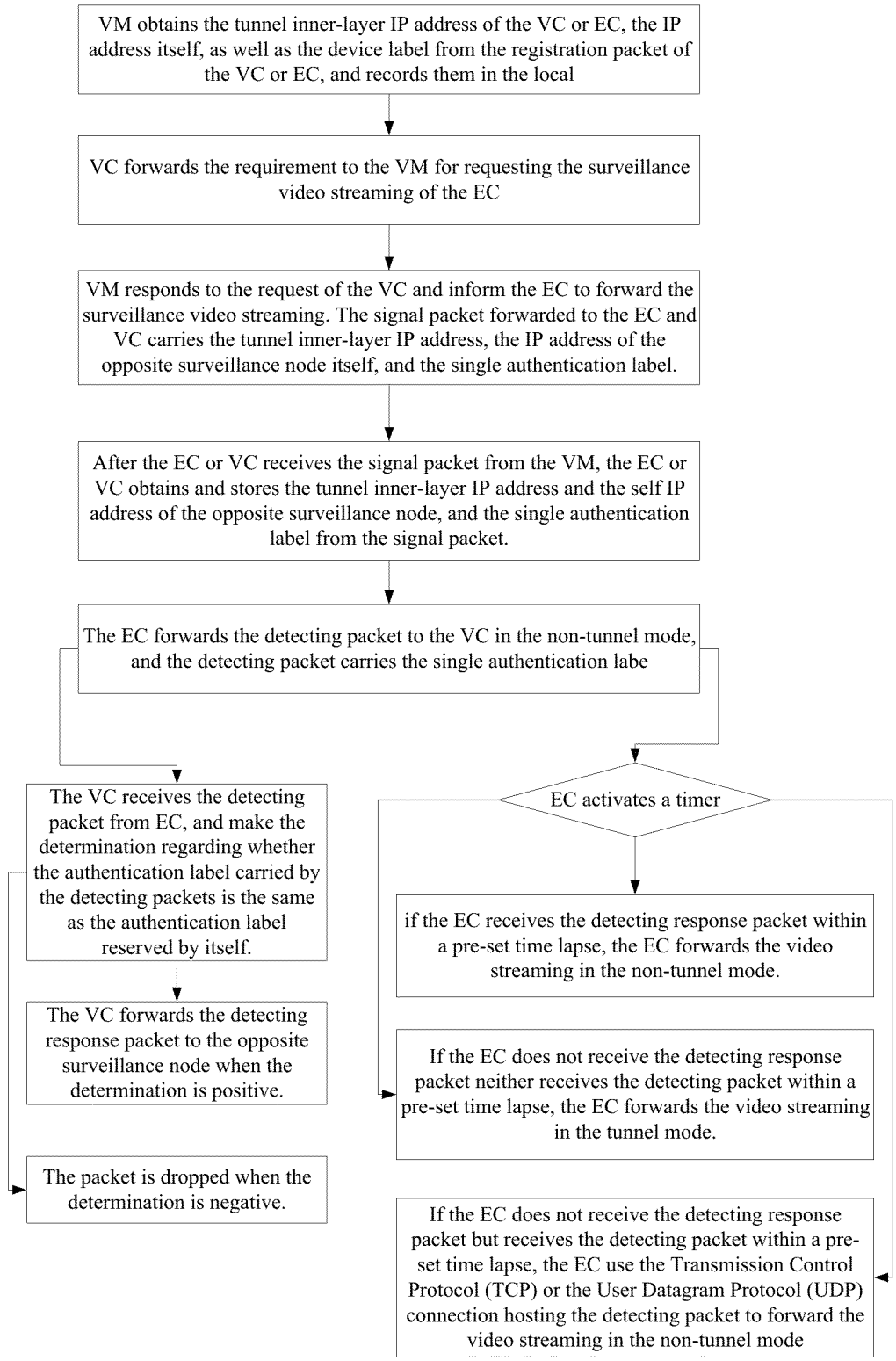
FIG. 9 is flowchart showing the processes of saving the wide area network bandwidth in one embodiment of the present invention.

Although the tunnel mode may solve the problem of the isolation device efficiently, however, the bandwidth of the wide area network may be over-consumed. If there are two surveillance nodes capable of communicating in the non-tunnel mode, it is obviously a waste for the wide area network bandwidth to pass through the wide area network via the tunnel mode. Please refer to FIGS. 6 and 9, which illustrate that how to save wide area network bandwidth. In the below description, the service processing in related to the signaling is performed by the signaling processing logic of each surveillance node. The packet between the signaling processing logic and outside network node is called the signaling packet. The related data (such as the surveillance video streaming) processing is performed by the data processing logic. The packets between the data processing logic and the outside network node are called data packets. The processing involved in the tunnel packet receiving/forwarding is performed by the tunnel processing logic and then be forwarded to the IP network via the interface logic. If the communicating process does not need passing through the tunnel processing logic (which means in the non-tunnel mode), the data processing logic or signaling processing logic recognize that the present packet requiring to be submitted to the network interface logic according to a inner route table. The difference between the signaling packet and the data packet is majorly the content indicated in the packet. The previous one is majorly indicating the signaling, and the later one is majorly indicating the data. Please refer to FIGS. 6 and 9, the processing steps of the present embodiment are as follows.

In the step 201, the VC and the EC register in the VM via the tunnel. The registration packet may carry the tunnel inner-layer IP address itself, the IP address itself, and the device label itself at the load of the registration packet (one of the signaling packet) to inform the VM.

In the step 202, after the VM receives the registration packet from the tunnel, the VM records the tunnel inner-layer IP address of the VC and EC, the IP address itself, and the device label in the local.

During the normal surveillance process, it is necessary for the EC and VC to initiate the registration toward the VM via the signaling packet after being on line. The registration packet may be forwarded to the VM via the tunnel. In the present invention, the registration packet not only carries the IP address of the surveillance node itself, but also carries the tunnel inner-layer IP address, and even carries the label itself (such as the MAC address or the CPU serial number etc.) in some embodiments. VM stores the IP address and the label in the registration packet of the surveillance node, and uses them in the following surveillance service process.

In the step 203, VC forwards the requirement to the VM for requesting the surveillance video streaming of the EC.

In the step 204, the VM responds to the request of the VC via the signaling packet, and correspondingly inform the EC to forward the surveillance video streaming to the VC via the signaling packet. The signaling packet forwarded from the VM to the EC and VC carries the tunnel inner-layer IP address of the opposite surveillance node, the IP address of the opposite surveillance node itself, and the single authentication label.

In the step 205, after the EC or VC receives the signaling packet from the VM, the EC or VC obtains and stores the tunnel inner-layer IP address and the self IP address of the opposite surveillance node, and the single authentication label from the signaling packet.

In the step 206, the EC forwards the detecting packet to the VC in the non-tunnel mode, and the detecting packet carries the single authentication label.

In the step 207, the VC forwards the detecting packet to the EC in the non-tunnel mode, and the detecting packet carries the single authentication label.

In the step 208, the EC or VC receives the detecting packet from the opposite surveillance node, and make the determination regarding whether the authentication label carried by the detecting packets is the same as the authentication label reserved by itself. The EC or VC forward the detecting response packet to the opposite surveillance node when the determination is positive, and the packet is dropped when the determination is negative.

In the step 209, if the EC receives the detecting response packet forwarded from the VC in the non-tunnel mode within a pre-set time lapse, the EC informs the data processing logic to forward the video streaming in the non-tunnel mode. If the EC does not receive the detecting response packet forwarded by the VC but receives the detecting packet forwarded by the VC within a pre-set time lapse, the EC inform the data processing logic to use the Transmission Control Protocol (TCP) or the User Datagram Protocol (UDP) connection loading the detecting packet of the VC to forward the video streaming. If the EC does not receive the detecting response packet forwarded by the VC neither receives the detecting packet forwarded by the VC within a pre-set time lapse, the EC informs the data processing logic to forward the video streaming in the tunnel mode.

In the one-time video streaming requesting (which is also called the live service) process, the EC and VC is the opposite surveillance node to each other. The VM assigns a single authentication label to the coming live service. The authentication label may be provided randomly by the VM according to the predetermined algorithm, and may also be provided by the VM according to label of the two surveillance node performing the live service. For example, the MAC addresses of the two surveillance node may be sequentially connected to form a 96-bit label. The signaling processing logics of the EC or VC participating in the live service store the single authentication label in the local. For the surveillance node, the main purpose of the single authentication label is to make a determination regarding whether the surveillance node forwarding the detecting packet is the opposite surveillance node participating in the live service after receiving the detecting packet.

In the live service, both EC and VC establish the tunnel connection with the tunnel service end, and hence the communication via tunnel mode certainly may work. The EC and VC, however, still may communicate via non-tunnel mode, and if the non-tunnel mode communication is possible, it should be adopted preferentially. By this way, the over-cost of the wide area network bandwidth by the tunnel mode may be avoided. Therefore, before the EC forwards the video streaming to the VC, the EC may forward the detecting packet to the VC via non-tunnel mode to make a determination regarding whether the both sides may communicates in the non-tunnel mode. Whether the EC and VC may communicate in the non-tunnel mode is determined by the Network Address Translation (NAT) relationship between both sides. Please refer to table 4, table 4 shows the different four NAT relationships, and the premise of the non-tunnel mode communication.

TABLE 4

| state | EC | VC | premise non-tunnel mode communication |
|---|---|---|---|
| 1 | inside the NAT1 | inside the NAT1 | N/A |
| 2 | inside the NAT1 | the public network outside the NAT1 | EC initiates the communication firstly |
| 3 | the public network outside the NAT1 | inside the NAT1 | VC initiates the communication firstly |
| 4 | inside the NAT1 | inside the NAT2 | cannot communicate |

When the EC or VC forwards the detecting packet, neither they are aware of the NAT relationship with the opposite surveillance node, and may not confirm the NAT relationship with either. For real scenario, the EC is configured for forwarding video streaming and the VC is configured for receiving, and VC does not forward the video streaming to EC. Therefore, in a basic embodiment, only the NAT relationships in state 1 and 2 must be considered. In state 1, the both sides are inside the same NAT device, and hence the VC is certainly capable of receiving the detecting packet forwarded from the EC. In state 2, the inner network device initiates the communication firstly according to the working principle of the NAT device, and hence if the VC is located in the public network (with respect to the NAT device 1) outside the NAT 1, the VC is certainly capable of receiving the detecting packet forwarded from the EC. Therefore, in states 1 and 2, VC only needs to make the determination regarding whether the authentication label carried by the packets is the same as the authentication label reserved in the local, and forwards the detecting response packet to the EC when the determination is positive. In states 1 and 2, EC obviously may receive the detecting response packet. The EC may activate a timer before forwarding the detecting packet. If the EC may receive the detecting response packet before the timer expires, the EC makes a determination that the communication with the VC via the non-tunnel mode is possible, and further inform the data processing logic to forward the video streaming to the VC via the non-tunnel mode. If the EC may not receive the detecting response packet forwarded from the VC before the timer expires, which means the VC may not receive the video streaming forwarded by the EC directly via the non-tunnel mode, the signaling processing logic of the EC may inform the data processing logic to forward the video streaming to the VC via the tunnel mode.

In a preferred embodiment, the EC does not receive the detecting response packet from the VC after forwarding the detecting packet. But this does mean the communication via the non-tunnel mode for both sides is totally impossible. In the state 3, the detecting packet forwarded by the EC is dropped by the NAT device 1, and hence the packet may not reach the VC (because the working principle of the NAT device—initiating from the inner side—does not be met). In this case, both VC and EC may forward the detecting packet to each other via the non-tunnel mode. Although the EC may not receive detecting response packet from the VC within the pre-set time lapse (timer is expired), but still may receive detecting packet forwarded from the VC. The EC then may inform the data processing logic to forward the video streaming using the TCP or the UDP connection by which the VC forwards the detecting packet. Using the TCP or the UDP connection to forward the video streaming is a skillful application of the working principle of the NAT. The working principle of the NAT requires the inner node initiating the communication firstly, and then forming the address translation flow table in the NAT device. Please refer to table 5 for the example form of the flow table.

TABLE 5

| Protocol Type | Public Network Address | Public Network Port | Destination Address | Destination Port | Inner Address | Inner Port |
|---|---|---|---|---|---|---|
| UDP | IP3 | 3001 | IP1 | 1001 | IP2 | 2001 |

If the IP addresses of the EC and the VC in state 3 are respectively IP1 and IP2, the items are formed in the NAT device, as shown in table 5, after VC forwarding the detecting packet to the EC. In the view of the EC, it is the NAT device establishing the UDP conversation with the EC. When EC forwards the packet, only packet having the destination address IP3 and the destination port 3001 may be forwarded by NAT device via the address transition to the VC. If EC forwards packet with the random destination port or the random destination address, in that case the packet would be dropped by the NAT device. Therefore, for the EC, only by using the TCP or the UDP connection where the VC forward detecting packet, the video streaming may be forwarded to the VC. What needs be clarified is that in the step 208, the VC needs respond to the detecting response packet when the VC receives the detecting packet forwarded from the opposite surveillance node and make a determination that the single authentication label is the same as the authentication label reserved in the local. The EC, however, may determine not to forward the detecting response packet (corresponding to the state 3). When the EC receives the detecting packet from the VC and makes a determination that the VC is the opposite surveillance node of the present live service via the single authentication label, the EC certainly may forward the video streaming to the VC via the non-tunnel mode by using the TCP or UDP connect. In the state 4, both EC and VC forward the detecting packet to each other, but neither side, however, may receive the packet. The timer activated by the EC obviously would expire. At this time, the EC may inform the data processing logic to forward the video streaming via the tunnel mode.

In the above description, the present invention solves the problem of the NAT relationship under the different circumstances by two ways. But it still requires to consider the double use of the same IP address due to the reasonable configuration of the NAT device. For example in the surveillance network, the IP address of the EC1 itself is 192.168.1.2, the IP address of the VC1 itself is 192.168.1.3, and the IP address of the VC2 itself is also 192.168.1.3. If the EC1 and VC2 is located inside the NAT device 1 and the VC1 is located inside the NAT device 2, the relationship between the VC1 and EC1 belongs to state 4 in table, and the both sides certainly cannot communicate under the non-tunnel mode. When the VC1 requesting the VC1 for the video streaming and the EC1 forwards the detecting packet to the VC1, the intermediate network device forwards the packet according to the destination address (192.168.1.3) of the packet, and the packet is actually forwarded to the VC2. If the VC2 is requesting the EC1 for the video streaming, the VC2 would respond to the detecting response packet. After the EC1 receives the detecting response packet, the EC1 determine that the communication with the VC1 via the non-tunnel mode is capable, and hence forwards the video streaming via the non-tunnel mode. Therefore, the VC2 may receive the video streaming correctly, but the VC1 does not receive the video streaming from the EC1 in fact. The above-mentioned single authentication label may prevent this situation. That is because the packet forwarded by EC1 carries the single authentication label, and the VC2 may determine that the authentication label is inconsistent with the authentication label reserved by itself. Even if the VC2 also sends the request to the EC1, the authentication label assigned by the VM to the VC2 is different from what the VC1 receives, and hence the VC2 does not forward the detecting response packet to the EC1. Accordingly, the EC1 may forward the video streaming to VC1 via the tunnel mode after the timer expires.

The method of saving the wide area network bandwidth for the surveillance nodes EC and VC performing the live service process in the surveillance network is described as above. With regard to the surveillance network, there is still the voice intercom service existed between the EC and VC. The proceeding process is basically similar, and the single difference is that the VC and EC are reciprocal due to the voice data packet forwarded in two-way. Therefore, the proceeding to forward the detecting packet and respond to the detecting response packet is more flexible, and any side may initiate the voice intercom firstly. For example, the VC may also use the timer. If the VC does not receive the detecting response packet but receive the detecting packet of the EC within a pre-set time lapse, the TCP or UDP connection where the detecting packet of the EC is loaded may be used to forward the voice streaming to the EC via non-tunnel mode. In addition, the video streaming and the voice streaming not only may be forwarded between the EC and VC in the surveillance network, but also is required to be forwarded between the MSs of two different domains in the multi-domain surveillance network. For example, VC1 requests the EC1 for the video streaming. The video streaming may need be forwarded from the MS1, which is in the domain where the EC1 is, to the MS2 in the local domain, and is finally forwarded to the VC1 via the MS2. In this case, the way similar to the above description may be used to forward the video streaming or the voice streaming between the two MS. What is different is that the two MSs recognize the IP address, the tunnel inner-layer IP address, and the device label of each other via the signal-layer interaction of the VMs in the two domains. Similarly, with regard to the video streaming replay service, the DMs (data management server) in different domains may be processed like the proceeding between the two MSs. The difference is merely the service. The previous one is the replay service, and the later one is the live service or the voice intercom service. In summary, with regard to the surveillance network, both two surveillance nodes may make a determination whether the communication via the non-tunnel mode is possible according to the method described in the present embodiment before the data packet interaction, when both sides cannot make sure whether the communication via the non-tunnel mode is possible. On the basis of using the tunnel mode to solve the problem caused by the isolation device, the present embodiment may further save the bandwidth (such as saving the wide area network bandwidth), and avoid the processing pressure in the region (such as the surveillance top-level domain) where the tunnel service section is.

The present invention further provides another embodiment to solve problem of over-consuming the wide area network bandwidth. Please refer to FIG. 6, which describes how to implement the wide area network bandwidth saving in the present embodiment.

In the step 301, the VC and the EC register in the VM via the tunnel. In addition to registering by the tunnel inner-layer IP address assigned by the LNS, the VC and the EC further carry the source IP address thereof in the local device into the registration packet to inform the VM.

For example, the IP address of the EC client in the inner network is 10.1.1.2 (optional), and the applied L2TP tunnel inner-layer IP address is 192.168.1.2. The IP address of the VC client in the inner network is 10.1.1.3 (optional), and the applied L2TP tunnel inner-layer IP address is 192.168.1.3.

In the step 302, after the VM receives the registration packet from the tunnel, the VM records the address information of the device carried in the registration packet.

In the step 303, the VC requests the surveillance video streaming of the EC via the tunnel, which means the VC forwards the request to the VM according to the tunnel mode as mentioned above.

In the step 304, the VM inform the EC to forward the surveillance video streaming.

In the step 305, after establish the service transmission channel between the EC and VC via the tunnel, VM actively forwards the non-tunnel mode attempt instruction to the EC and VC, the instruction is carried in the keep-alive packet of the surveillance terminal node and the VM.

What must be clarified is that establishing the service transmission channel via the tunnel mode may certify the fluency of the service. The service transmission channel certainly may be established between the EC and VC via the tunnel in the beginning, which is helpful to sense of the VC user.

In the step 306, after receiving the non-tunnel mode attempt instruction from the VM, the EC initiates the non-tunnel mode communication to the opposite side firstly. The VC and EC performing the non-tunnel mode attempt instruction is respectively called the T-VC and the T-EC in the present invention.

The T-EC and T-VC may forward the packet via the private protocol to perform the non-tunnel mode communication. For example, the T-EC starts the attempt of forwarding the specific packet to the T-VC by using the inner network IP address of the T-VC as the destination address, and it certainly may be initiated by VC firstly.

In the step 307, if receiving the information forwarded from the EC, the VC reports the received information to the VM; the VC may report by the Session Initiation Protocol (SIP) information.

In the step 308, the VM receives the report carrying the non-tunnel mode attempt forwarded from the VC, and makes a determination regarding whether the EC can communicated with the VC via the inner network according to the address information in the packet of the report and the address information reserved by itself, and forwards the communication mode switching instruction to the EC to switch from the L2TP tunnel mode to the non-tunnel mode when the determination is positive.

After receiving the report (which may be carried via the SIP information) forwarded from VC, the VM makes a determination regarding whether the T-EC and T-VC may perform the non-tunnel mode according to report of the VC. If the result is positive, the VM informs the EC and the VC to switch from the tunnel mode to the non-tunnel mode (which is usually called the inner network communication mode or the private network communication mode, and majorly switching the destination IP address the service streaming to the inner network IP address of the VC). Otherwise, the VM is silent and keep the T-EC and the T-VC being in the tunnel mode. According to the real practices, there are two bases included in the step 308 of the present invention as the basis of the VM to make the determination regarding whether the both sides may perform the non-tunnel mode. These two bases may be performed in combination or solely.

The first Basis is that the tunnel inner-layer IP address of the VC forwarding the report must be the same as the address of T-VC.

The VM make the determination regarding whether the tunnel inner-layer IP address of the VC forwarding the report is the same as the address of T-VC itself. If the result is positive, which means the non-tunnel mode is achievable. Otherwise, the non-tunnel mode is unachievable. Considering the IP address may be used repeatedly in the different inner network, the receipt of the report forwarded from the VC to the VM may only clarify that the communication packet forwarded from the T-EC via the inner network is received by the VC having the same address. If the T-EC is proceeding the service communication with the T-VC of which the address is 10.1.1.3 via the tunnel, and the T-VC is actually in the same inner network as the T-EC, T-VC may receive the non-tunnel mode information of the T-EC and report to the VM. But if the T-VC and the T-EC is in the different inner network, and there is occasionally an address of the VC2, which is in the same inner network as the T-EC, is 10.1.1.3, the VC2 cloud receive the information of T-EC too, and report to the VM. In this case, if the VM does not make the determination regarding whether the tunnel inner-layer IP address of the VC forwarding the report is the same as the address of T-VC itself, it may result in an error. If the tunnel inner-layer IP address of the VC forwarding the report is the same as the address of T-VC itself, it confirms that the report is actually forwarded by the T-VC. Otherwise, it means that the report is forwarded by another VC in the other network, and the inner-layer IP addresses of both parties are occasionally identical. Considering the mechanism to make the determination regarding whether two nodes having the known IP addresses may proceed the IP communication, the most general way is using the checking techniques such as Ping. But Take into account that the repeated IP addresses in the different inner network, performing the determination by the VM is adopted in the present invention to avoid the mistake caused by the repeated IP addresses. This is the reason why it is not the general techniques such as Ping to be adopted to make the determination regarding whether the EC and the VC may perform the non-tunnel mode in the present invention.

The second Basis is that the tunnel inner-layer IP address of the EC in the report of the VC is the same as the address of T-EC.

If the VC is actually the T-VC, the misjudgment may be avoided in a large extent. However, in order to be more serious, the VM may further make the determination regarding whether the EC in the VC report is the T-EC, which T-VC perform the communication with. If the result is positive, which means the non-tunnel mode is achievable. Otherwise, the non-tunnel mode is unachievable. Considering the possibility of the respective combination of T-EC1/T-VC1 and T-EC2/T-VC2 both proceed the instruction of the non-tunnel mode attempt, in order to be more serious, when the VC is confirmed as the T-VC1, VM may further check the address of the EC in the report of the T-VC1. If the tunnel inner-layer IP address of the EC carried in the report is the same as the tunnel inner-layer IP address of the T-EC2, it means that the T-VC1 does not receive the non-tunnel mode information from the T-EC1. The T-VC1 and the T-EC1 are not in the same inner network, and cannot perform the non-tunnel mode, which means the T-EC1 and the T-VC1 keep in the tunnel mode. Similarly, if the tunnel inner-layer IP address of the EC carried in the report is the same as the tunnel inner-layer IP address of the T-EC1, the VM inform the T-EC1 and the T-VC1 to switch to the non-tunnel mode.

In the step 309, after receiving the instructions of switching to the non-tunnel mode from the VM, the EC switches from the tunnel mode to the inner network IP communication mode, and forwards the service streaming (which is the surveillance video streaming) by changing the destination IP address of the streaming with the inner network IP address of the VC.

Please also refer to the FIG. 6, the tunnel mode is switched to the inner network IP communication mode. The signaling processing logic, which is the control service processing logic, switches the service streaming from the tunnel processing logic, and hence the service streaming is no more proceeded by the tunnel processing. The service streaming is switched from the tunnel to the inner network, which may largely save the valuable bandwidth of the wide area network, and reasonably and efficiently utilize the existing non-tunnel mode resource, especially more meaningful for the large surveillance network.

The foregoing descriptions are only examples of the present disclosure and are not for use in limiting the protection scope thereof. Any modification, equivalent replacement and improvement made under the spirit and principle of the present disclosure should be included in the protection scope thereof.

The invention claimed is:

1. A surveillance node passing through a network isolation device in an Internet Protocol (IP) surveillance system, wherein the surveillance node is located within an inner network of a network isolation device, said surveillance node comprising a processor, network interface and computer readable storage medium, wherein the processor is configured to:
   send and receive a packet in the IP network;
   process a surveillance signaling;
   initiate a tunnel connection request towards the tunnel server by a first IP address of the surveillance node so as to establish a tunnel connection with the tunnel server, and obtain a second IP address assigned by the tunnel server after establishing the tunnel connection;
   decapsulate a tunnel packet received from the tunnel server to obtain an inner-layer IP packet indicating the surveillance signaling; wherein the inner-layer IP packet is a packet forwarded from an outside surveillance node of the network isolation device, a destination address of the tunnel packet being the first IP address, a source address of the tunnel packet being an IP address of the tunnel server itself; a destination address of the inner-layer IP packet being the second IP address, a source IP address being an IP address of the outside surveillance node;
   wherein the processor is further configured to encapsulate the generated surveillance signaling into the inner-layer IP packet, and to encapsulate the inner-layer IP packet into the tunnel packet and the tunnel packet is sent to the tunnel server via the network interface wherein a source address of the inner-layer IP packet is the second IP address, a destination IP address of the inner-layer packet being the IP address of the outside surveillance node, a source address of the tunnel packet being the first IP address, and a destination address of the tunnel packet being the IP address of the tunnel server.

2. The surveillance node in accordance with claim 1, wherein the processor is further configured to;
   logic decapsulate the tunnel packet received from the tunnel server to obtain an inner-layer IP packet indicating the surveillance data; wherein the inner-layer IP packet is the packet forwarded from the outside surveillance node of the network isolation device, the destination address of the tunnel packet being the first IP address, the source address of the tunnel packet being the IP address of the tunnel server; the destination address of the inner-layer IP packet being the second IP address, the source IP address being the IP address of the outside surveillance node;
   encapsulate a surveillance data into the inner-layer IP packet, and
   encapsulate the inner-layer IP packet into the tunnel packet and the tunnel packet is sent to the tunnel server via the network interface, and the tunnel server forwards the inner-layer IP packet to the outside surveillance node of the network isolation device, wherein the source address of the inner-layer IP packet is the second IP address, the destination IP address of the inner-layer packet being the IP address of the surveillance node of the outside network, the source address of the tunnel packet being the IP address of said surveillance node, and the destination address of the tunnel packet being the IP address of the tunnel server itself.

3. The surveillance node in accordance with claim 2, wherein the processor is further configured to obtain and reserve an single authentication label before said surveillance node having a data packet communication with an opposite surveillance node, the single authentication label being assigned by an management server for the surveillance node and the opposite surveillance node;
   forward a detecting packet to the opposite surveillance node in a non-tunnel mode, wherein the detecting packet carries the single authentication label; and
   forward a data packet to the opposite surveillance node through the non-tunnel mode upon receiving a detecting response packet from the opposite surveillance node, wherein the detecting response packet is forwarded by the opposite surveillance node upon the opposite surveillance node determine the authentication label carried by the detecting packet is the same as the authentication label reserved itself.

4. The surveillance node in accordance with claim 3, wherein the processor is further configured to:
   make a determination regarding whether the authentication label carried by a detecting packet is the same as the authentication label reserved by the surveillance node when the detecting packet forwarded from the opposite surveillance node is received, and
   use the Transmission Control Protocol (TCP) or the User Datagram Protocol (UDP) connection loading the detecting packet to forward the data packet to the opposite surveillance node through the non-tunnel mode when the determination is positive, and to drop the detecting packet when the determination is negative.

5. The surveillance node in accordance with claim 4, wherein the processor is further configured to;
   after the detecting packet is forwarded, forward the data packet to the opposite surveillance node in the tunnel mode upon determining a detecting response packet or the detecting packet forwarded by the opposite surveillance node has not been received within a pre-set time lapse.

6. The surveillance node in accordance with claim 1, wherein the surveillance node is a video management server (VM), the processor is further configured to:
   reserve addresses information in registration packets of a front-end surveillance equipment and a back-end surveillance equipment, and instruct the front-end surveillance equipment to correspondingly forward a surveillance video streaming according to an on-demand request of the back-end surveillance equipment;
   after the front-end surveillance equipment and the back-end surveillance equipment establishing a transmission channel of the surveillance video streaming via a tunnel, forward an instruction to the front-end surveillance equipment and the back-end surveillance equipment for attempting the non-tunnel mode with an opposite side; and
   make a determination regarding whether the front-end surveillance equipment can communicated with the back-end surveillance equipment via an inner network according to an address information in a packet of an report and an address information reserved by the surveillance node, wherein the packet is forwarded from the back-end surveillance equipment in the non-tunnel mode, and to forward a communication mode switching instruction to instruct the front-end surveillance equipment to switch from the tunnel mode to the non-tunnel mode when the determination is positive.

7. The surveillance node in accordance with claim 6, wherein, the address information in the packet of the report comprises a tunnel inner-layer IP address, wherein the processor is further configured to
   make a determination that the front-end surveillance equipment can communicate with the back-end surveillance equipment via the non-tunnel mode, the basis of the determination comprising:
      a tunnel inner-layer IP address of the back-end surveillance equipment being the same as a tunnel inner-layer IP address reserved by the VM, wherein the report is forwarded by the back-end surveillance equipment; and
      a tunnel inner-layer IP address of the front-end surveillance equipment being the same as the tunnel inner-layer IP address reserved by the VM, wherein the tunnel inner-layer IP address of the front-end surveillance equipment is in the report forwarded by the back-end surveillance equipment.

8. The surveillance node in accordance with claim 1, wherein the surveillance node is the front-end surveillance equipment, and the processor is further configured to;
   after establishing a surveillance video streaming transmission channel with the back-end surveillance equipment via a tunnel, receive a non-tunnel mode attempt instruction forwarded by the VM, and
   make an attempt to establish the non-tunnel mode with the back-end surveillance equipment according to the non-tunnel mode attempt instruction, and to switch a communication mode with the back-end surveillance equipment from a tunnel mode to a non-tunnel mode according to a communication mode switching instruction forwarded by the VM when the attempt is successful.

9. The surveillance node in accordance with claim 1, wherein the surveillance node is the back-end surveillance equipment, and the processor is further configured to;
   after establishing a surveillance video streaming transmission channel with the front-end surveillance equipment via a tunnel, receive a non-tunnel mode attempt instruction forwarded by the VM;
   forward a report to the VM upon receiving a packet forwarded by the front-end surveillance equipment via an inner network; and
   switch a communication mode between the front-end surveillance equipment and the surveillance node from a tunnel mode to a non-tunnel mode, when an attempt to establish the non-tunnel mode with the front-end surveillance equipment is positive.

10. A method for a surveillance node passing via a network isolation device in an IP surveillance system, wherein the surveillance node is within an inner network of the network isolation device, the method comprising:
   a) initiating a tunnel connection request toward the tunnel server by a first IP address of the surveillance node, so as to establish a tunnel connection with the tunnel server; obtaining a second IP address assigned by the tunnel server from the tunnel server after establishing the tunnel connection;
   b) decapsulating a tunnel packet received from the tunnel server to obtain an inner-layer IP packet indicating a surveillance signaling, and processing the surveillance signaling, wherein the inner-layer IP packet is a packet forwarded by an outside surveillance node of the network isolation device, a destination address of the tunnel packet being the first IP address, a source address of the tunnel packet being an IP address of the tunnel server, a destination address of the inner-layer IP packet being the second IP address, a source IP address being an IP address of the outside surveillance node;
   c) encapsulating the surveillance signaling generated by the surveillance node into the inner-layer IP packet, then encapsulating the inner-layer IP packet into the tunnel packet, forwarding the tunnel packet to the tunnel server, and forwarding the inner-layer IP packet to a outside surveillance node of a network isolation device by the tunnel server,
   wherein a source address the inner-layer IP packet is the second IP address, a destination address of the inner-layer packet being an IP address of the outside surveillance node, a source address of the tunnel packet being an IP address of the surveillance node, and a destination address of the tunnel packet being an IP address of the tunnel server.

11. The method in accordance with claim 10, further comprising:
   d) decapsulating the tunnel packet received from the tunnel server to obtain an inner-layer IP packet indicating a surveillance data, and processing the surveillance data, wherein the inner-layer IP packet is a packet forwarded from the outside surveillance node of the network isolation device, a destination address of the tunnel packet being the first IP address, a source address of the tunnel packet being an IP address of the tunnel server, the destination address of the inner-layer IP packet being the second IP address, a source IP address being the IP address of the outside surveillance node; or
   e) encapsulating a surveillance data generated by the surveillance node into the inner-layer IP packet, and encapsulating the inner-layer IP packet into the tunnel packet, forwarding the tunnel packet, and forwarding the inner-layer IP packet to the outside surveillance node of the network isolation device by the tunnel server, wherein the source address of the inner-layer IP packet is the second IP address, the destination address of the inner-layer packet being the IP address of the surveillance node of the outside network, the source address of the tunnel packet being the IP address of the surveillance node, and the destination address of the tunnel packet being the IP address of the tunnel server.

12. The method in accordance with claim 11, further comprising:
   f) obtaining and reserving an single authentication label before said surveillance node having a data packet communication with an opposite surveillance node, the single authentication label being assigned by an management server for the surveillance node and the opposite surveillance node; forwarding a detecting packet to the opposite surveillance node in a non-tunnel mode, wherein the detecting packet carries the single authentication label; and forwarding a data packet to the opposite surveillance node via the non-tunnel mode upon receiving the detecting response packet from the opposite surveillance node, wherein the detecting response packet is forwarded by the opposite surveillance node upon the opposite surveillance node determine the authentication label carried by the detecting packet is the same as the authentication label reserved itself.

13. The method in accordance with claim 12, further comprising:
   g) make the determination regarding whether the authentication label carried by a detecting packet is the same as the authentication label reserved by the surveillance node upon receiving the detecting packet forwarded from the opposite surveillance node, and using the TCP or UDP connection that loading the detecting packet to forward the data packet to the opposite surveillance node via the non-tunnel mode when the determination is positive, and dropping the data packet when the determination is negative.

14. The method in accordance with claim 13, wherein the step f) further comprises:
   after the detecting packet being forwarded, forwarding the data packet to the opposite surveillance node in the tunnel mode, upon determining a detecting response packet or the detecting packet forwarded by the opposite surveillance node has not been received within a pre-set time lapse.

15. The method in accordance with claim 10, wherein the surveillance node is the VM, the method further comprising:
   h) reserving addresses information in registration packets of a front-end surveillance equipment and the back-end surveillance equipment, and instructing the front-end surveillance equipment to correspondingly forward a surveillance video streaming according to an on-demand request of a back-end surveillance equipment;
   i) after the front-end surveillance equipment and the back-end surveillance equipment establishing a transmission channel of the surveillance video streaming via a tunnel, forwarding an instruction to the front-end surveillance equipment and the back-end surveillance equipment for attempting the non-tunnel mode with an opposite side; and make a determination regarding whether the front-end surveillance equipment can communicated with the back-end surveillance equipment via an inner network according to an address information in a packet of an report and an address information reserved by the surveillance node, wherein the packet is forwarded from the back-end surveillance equipment in the non-tunnel mode, and forwarding a communication mode switching instruction to instruct the front-end surveillance equipment to switch from the tunnel mode to the non-tunnel mode when the determination is positive.

16. The method in accordance with claim 15, wherein the address information comprises a tunnel inner-layer IP address, wherein making a determination that the front-end surveillance equipment can communicate with the back-end surveillance equipment via the non-tunnel mode, the basis of the determination comprising:
   a tunnel inner-layer IP address of the back-end surveillance equipment being the same as a tunnel inner-layer IP address reserved by the VM, wherein the report is forwarded by the back-end surveillance equipment; and
   a tunnel inner-layer IP address of the front-end surveillance equipment being the same as the tunnel inner-layer IP address reserved by the VM, wherein the tunnel inner-layer IP address of the front-end surveillance equipment is in the report forwarded by the back-end surveillance equipment.

17. The method in accordance with claim 10, wherein the surveillance node is the front-end surveillance equipment, and further comprises:
   j) after establishing a surveillance video streaming transmission channel with the back-end surveillance equipment via a tunnel, receiving a non-tunnel mode attempt instruction forwarded by the VM; and making an attempt to establish the non-tunnel mode with the back-end surveillance equipment according to the non-tunnel mode attempt instruction; and switching a communication mode with the back-end surveillance equipment from a tunnel mode to a non-tunnel mode according to a communication mode switching instruction forwarded by the VM when the attempt is successful.

18. The method in accordance with claim 10, wherein the surveillance node being the back-end surveillance equipment, and the method further comprises:
   after establishing a surveillance video streaming transmission channel with the front-end surveillance equipment via a tunnel, receiving a non-tunnel mode attempt instruction forwarded by the VM; and forwarding a report to the VM upon receiving a packet forwarded by the front-end surveillance equipment via an inner network; and switching a communication mode between the front-end surveillance equipment and the surveillance node from a tunnel mode to a non-tunnel mode, when an attempt to establish the non-tunnel mode with the front-end surveillance equipment is positive.

* * * * *